US012795041B2

United States Patent

(12) United States Patent
Han et al.

(10) Patent No.: US 12,795,041 B2
(45) Date of Patent: Nov. 10, 2026

(54) IMAGE DISPLAY APPARATUS

(71) Applicant: LG ELECTRONICS INC., Seoul (KR)

(72) Inventors: Sanghyun Han, Seoul (KR); Yookyung Uh, Seoul (KR); Hyungyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 18/771,666

(22) Filed: Jul. 12, 2024

(65) Prior Publication Data

US 2025/0133183 A1 Apr. 24, 2025

(30) Foreign Application Priority Data

Oct. 24, 2023 (KR) ........................ 10-2023-0142574

(51) Int. Cl.
*H04R 3/12* (2006.01)
*G06F 3/16* (2006.01)
*H04N 5/60* (2006.01)

(52) U.S. Cl.
CPC ............... *H04N 5/60* (2013.01); *G06F 3/162* (2013.01); *H04R 3/12* (2013.01)

(58) Field of Classification Search
CPC ........ H04R 3/12; H04R 2420/07; G06F 3/162
See application file for complete search history.

(56) References Cited

U.S. PATENT DOCUMENTS 9,681,183 B1 6/2017 Majid
10,123,142 B2 * 11/2018 Lee ......................... H04S 7/308
11,259,192 B2 * 2/2022 Hariharan ........... H04L 43/0847
11,831,288 B2 * 11/2023 Beckhardt .............. H03G 5/165
11,871,069 B2 * 1/2024 You .......................... H04R 3/12
12,028,691 B2 * 7/2024 Berger ...................... H04R 5/04
(Continued)

FOREIGN PATENT DOCUMENTS

WO 2018106447 6/2018

OTHER PUBLICATIONS

European Patent Office Application Serial No. 24186725.8, Search Report dated Dec. 6, 2024, 12 pages.

*Primary Examiner* — Disler Paul

(74) *Attorney, Agent, or Firm* — LEE, HONG, DEGERMAN, KANG & WAIMEY

(57) ABSTRACT

An image display apparatus is disclosed. The image display apparatus according to an embodiment of the present disclosure comprises: a display; an audio output device; an interface to exchange data with an external sound output device in a wired manner; a wireless communication device to exchange data with the external sound output device in a wireless manner; and a signal processing device to, in a simultaneous sound output mode and in a mode of wireless transmission to the external sound output device, output a first audio signal to the audio output device, and wirelessly transmit a second audio signal based on a first format, and, in response to a number of retransmission requests from the external sound output device being greater than or equal to a reference value, wirelessly transmit an audio signal based on a second format. Accordingly, it is possible to stably output sound through the external sound output device wirelessly connected to the image display apparatus.

18 Claims, 26 Drawing Sheets

(56) References Cited

U.S. PATENT DOCUMENTS

| | | | |
|---|---|---|---|
| 12,476,601 | B2 * | 11/2025 | Beckhardt ................ H03G 1/02 |
| 2018/0152778 | A1 * | 5/2018 | Du ....................... H04R 1/1016 |
| 2018/0167695 | A1 | 6/2018 | Kohara |
| 2018/0197501 | A1 | 7/2018 | Veeramani et al. |
| 2020/0092515 | A1 | 3/2020 | Stern et al. |
| 2020/0351747 | A1 | 11/2020 | Verger et al. |
| 2023/0216910 | A1 | 7/2023 | Aggarwal et al. |

* cited by examiner

| Audio format | Data Transfer Rate |
|---|---|
| 2 ch PCM | 4Mbps |
| Dolby Digital | 6Mbps |
| Dolby Digita + | 9Mbps |
| Dolby TrueHD MAT | 25Mbps |
| DTS | 9Mbps |
| DTS-HD | 25Mbps |
| Multi channel PCM | 36Mbps |

IMAGE DISPLAY APPARATUS

CROSS-REFERENCE TO RELATED APPLICATION(S)

Pursuant to 35 U.S.C. § 119, this application claims the benefit of earlier filing date and right of priority to Korean Application No(s). 10-2023-0142574, filed on Oct. 24, 2023, the contents of which are all incorporated by reference herein in its entirety.

BACKGROUND

1. Field

This disclosure relates to an image display apparatus, and more particularly to an image display apparatus in which an external sound output device which is connected wirelessly may stably output sound.

2. Description of the Related Art

An image display apparatus is an apparatus capable of displaying various images.

When an image is displayed on the image display apparatus, sound corresponding to the image is output.

With demand from users for a full, rich sound, the output power required for the image display apparatus to output sound increases, and a separate sound output device is increasingly used as well.

However, in the case where the external sound output device is connected by wire to the image display apparatus, there is inconvenience in that installation is limited due to a wired cable and the like.

SUMMARY

It is an objective of the present disclosure to provide an image display apparatus in which an external sound output device that is connected wirelessly may stably output sound.

It is another objective of the present disclosure to provide an image display apparatus in which the image display apparatus and an external sound output device connected wirelessly may simultaneously output sound.

It is further another objective of the present disclosure to provide an image display apparatus capable of transmitting a signal to an external sound output device in a wired or wireless manner.

In order to achieve the above and other objectives, an image display apparatus according to an embodiment of the present disclosure comprises: a display; an audio output device configured to output sound; an interface configured to exchange data with an external sound output device in a wired manner; a wireless communication device configured to exchange data with the external sound output device in a wireless manner; and a signal processing device configured to, in a simultaneous sound output mode of the external sound output device and the audio output device and in a mode of wireless transmission to the external sound output device, output a first audio signal to the audio output device, and wirelessly transmit a second audio signal based on a first format to the external sound output device, and, in response to a number of retransmission requests from the external sound output device being greater than or equal to a reference value, wirelessly transmit an audio signal based on a second format to the external sound output device.

Meanwhile, in response to the number of retransmission requests from the external sound output device being greater than or equal to the reference value, the signal processing device may be configured to wirelessly transmit an audio signal, which is based on the second format with a wireless data transfer rate less than the first format, to the external sound output device.

Meanwhile, when outputting the audio signal based on the second format, the signal processing device may be configured to output an audio signal based on the first format to the audio output device.

Meanwhile, when outputting the audio signal based on the second format, the signal processing device may be configured to output an audio signal based on the second format to the audio output device.

Meanwhile, in the simultaneous sound output mode of the external sound output device and the audio output device and in the mode of wireless transmission to the external sound output device, the signal processing device may be configured to output a first audio signal based on the first format to the audio output device, and wirelessly transmit a second audio signal based on the first format to the external sound output device, wherein in response to the number of retransmission requests from the external sound output device being greater than or equal to the reference value, the signal processing device may be configured to output a third audio signal based on the second format to the audio output device, and wirelessly transmit a fourth audio signal based on the second format to the external sound output device.

Meanwhile, in a single sound output mode of the image display apparatus, the signal processing device may be configured to output a fifth audio signal, and the audio output device may be configured to output sound corresponding to the fifth audio signal.

Meanwhile, in a single sound output mode of the external sound output device and in the mode of wireless transmission to the external sound output device, the signal processing device may be configured to wirelessly transmit an audio signal, which is based on a third format with a wireless data transfer rate greater than the first format, to the external sound output device.

Meanwhile, in the single sound output mode of the external sound output device and in the mode of wireless transmission to the external sound output device, the signal processing device may be configured to wirelessly transmit the audio signal based on the first format to the external sound output device.

Meanwhile, in the single sound output mode of the external sound output device and in the mode of wireless transmission to the external sound output device, the signal processing device may be configured to wirelessly transmit the audio signal based on the third format to the external sound output device, wherein in response to the number of retransmission requests from the external sound output device being greater than or equal to the reference value or a second reference value, the signal processing device may be configured to wirelessly transmit an audio signal based on a fourth format to the external sound output device.

Meanwhile, after transmitting the audio signal based on the fourth format, in response to the number of retransmission requests from the external sound output device being greater than or equal to the reference value or an allowable value, the signal processing device may be configured to switch the mode of wireless transmission to the external sound output device to a wired transmission mode, and transmit the audio signal by wire to the external sound output device.

Meanwhile, in the mode of wireless transmission to the external sound output device, the signal processing device may be configured to wirelessly transmit an audio signal, which is based on an audio format processable by the external sound output device, to the external sound output device.

Meanwhile, the signal processing device may be configured to receive, from the external sound output device, audio format information processable by the external sound output device, and may be configured to wirelessly transmit an audio signal based on an audio format, which is selected from the received audio format information based on an environment of wireless connection with the external sound output device, to the external sound output device.

Meanwhile, the interface may be configured to receive, from the external sound output device, the audio format information processable by the external sound output device, and to transmit the received audio format information to the signal processing device.

Meanwhile, after transmitting the audio signal based on the second format, in response to the number of retransmission requests from the external sound output device being greater than or equal to the reference value or an allowable value, the signal processing device may be configured to switch the mode of wireless transmission to the external sound output device to a wired transmission mode, and transmit the audio signal by wire to the external sound output device.

Meanwhile, the signal processing device may be configured to control a first delay added to the first audio signal, in the simultaneous sound output mode of the external sound output device and the audio output device and in the mode of wireless transmission to the external sound output device, to be greater than a second delay added to the first audio signal, in the simultaneous sound output mode of the external sound output device and the audio output device and in the wired transmission mode of wired transmission to the external sound output device.

Meanwhile, based on content displayed on the display, the signal processing device may be configured to change a format of an audio signal transmitted wirelessly to the external sound output device.

An image display apparatus according to another embodiment of the present disclosure comprises: a display; an audio output device configured to output sound; an interface configured to exchange data with an external sound output device in a wired manner; a wireless communication device configured to exchange data with the external sound output device in a wireless manner; and a signal processing device configured to, in a mode of wireless transmission to the external sound output device, wirelessly transmit an audio signal based on a first format to the external sound output device, and, in response to a number of retransmission requests from the external sound output device being greater than or equal to a reference value, wirelessly transmit an audio signal based on a second format to the external sound output device, and after transmitting the audio signal based on the second format, in response to the number of retransmission requests from the external sound output device being greater than or equal to the reference value or an allowable value, switch the mode of wireless transmission to the external sound output device to a wired transmission mode, and transmit the audio signal by wire to the external sound output device.

Meanwhile, the interface may be configured to receive, from the external sound output device, audio format information processable by the external sound output device, and to transmit the received audio format information to the signal processing device, wherein the signal processing device is configured to wirelessly transmit an audio signal based on an audio format, which is selected from the received audio format information based on an environment of wireless connection with the external sound output device, to the external sound output device.

Meanwhile, the signal processing device may be configured to control a first delay added to an audio signal transmitted to the audio output device, in a simultaneous sound output mode of the external sound output device and the audio output device and in the mode of wireless transmission to the external sound output device, to be greater than a second delay added to the audio signal transmitted to the audio output device, in the simultaneous sound output mode of the external sound output device and the audio output device and in the wired transmission mode of wired transmission to the external sound output device.

Meanwhile, based on content displayed on the display, the signal processing device is configured to change a format of an audio signal transmitted wirelessly to the external sound output device.

DETAILED DESCRIPTION OF THE PREFERRED EMBODIMENTS

Hereinafter, the present disclosure will be described in further detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
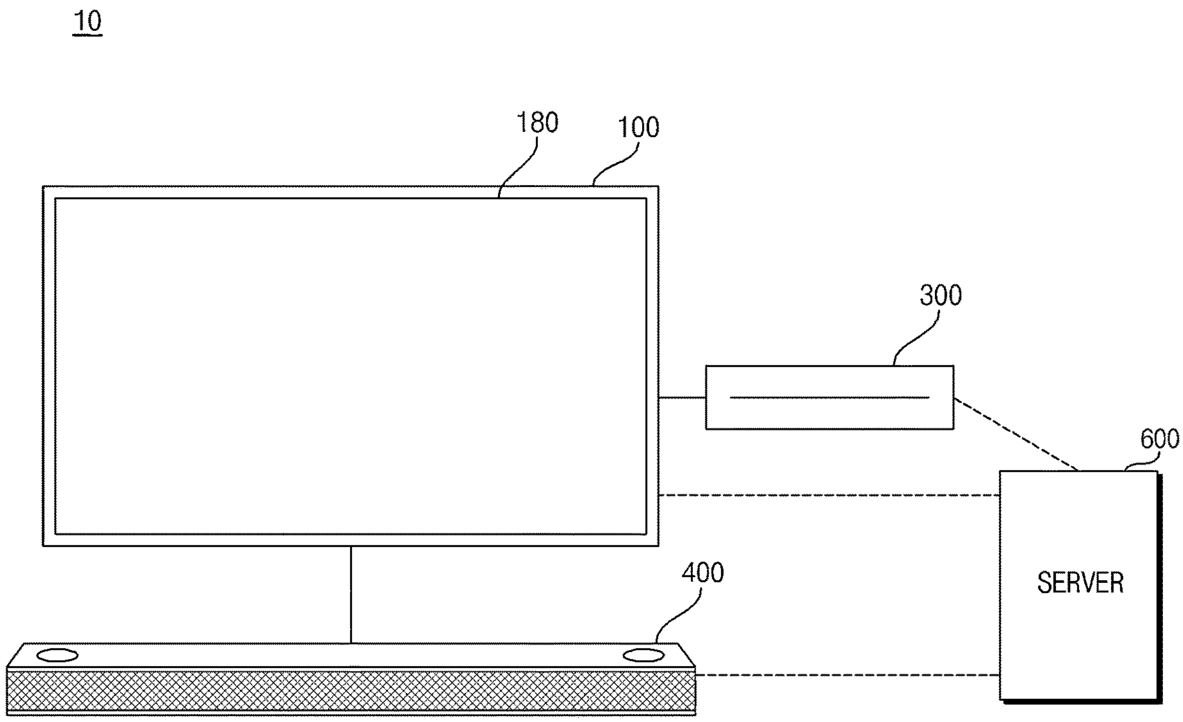
FIG. 1 is a diagram illustrating an image display system according to an embodiment of the present disclosure.

FIG. 1 is a diagram illustrating an image display system according to an embodiment of the present disclosure.

Referring to the drawing, the image display system 10 according to an embodiment of the present disclosure may include an image display apparatus 100 including a display 180, and an external sound output device 400.

The image display system 10 may include a set-top box 300, the external sound output device 400, and a server 600.

The image display apparatus 100 according to an embodiment of the present disclosure may receive images from the set-top box 300 or the server 600.

For example, the image display apparatus 100 may receive an image signal from the set-top box 300 through an HDMI terminal.

Figure 2:
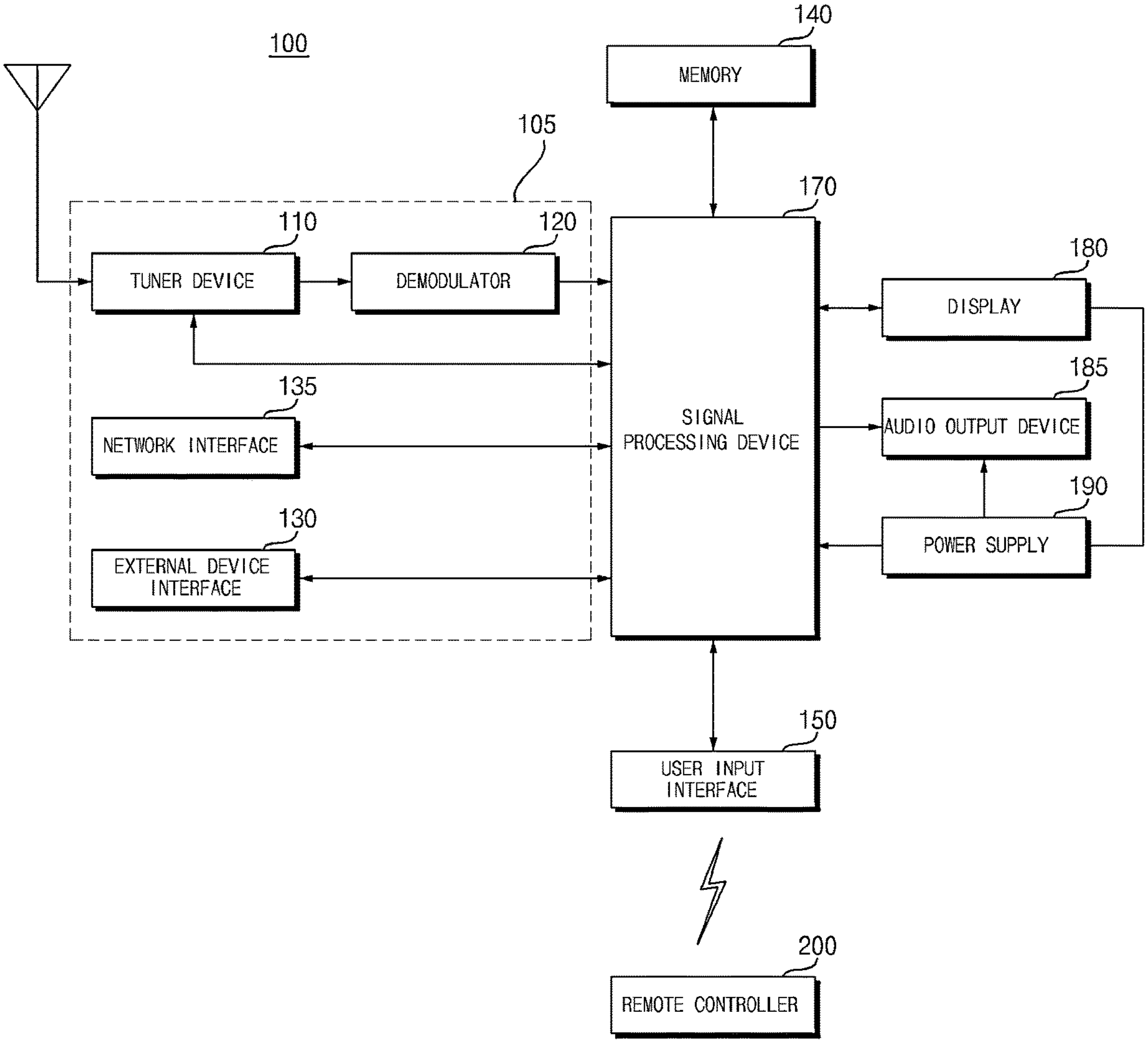
FIG. 2 is an exemplary internal block diagram of an image display apparatus of FIG. 1.

In another example, the image display apparatus 100 may receive an image signal from the server 600 through a network terminal or a network interface 135 (see FIG. 2).

In further another example, the image display apparatus 100 may receive a broadcast signal through an internal tuner device 110 (see FIG. 2).

Meanwhile, the image display apparatus 100 according to an embodiment of the present disclosure may include: a display 180; an audio output device 185 (see FIG. 2) configured to output sound; an interface 130*a* (see FIG. 6) configured to exchange data with an external sound output device 400 in a wired manner; a wireless communication device 135*a* (see FIG. 6) configured to exchange data with the external sound output device 400 in a wireless manner; and a signal processing device 170 (see FIG. 2) which, in a simultaneous sound output mode of the external sound output device 400 and the audio output device 185 and in a mode of wireless transmission to the external sound output device 400, is configured to output a first audio signal to the audio output device 185, and wirelessly transmit a second audio signal based on a first format to the external sound output device 400, and, in response to a number of times the external sound output device 400 requests retransmission being greater than or equal to a reference value, wirelessly transmit an audio signal based on a second format to the external sound output device 400.

Accordingly, the external sound output device 400 which is wirelessly connected may stably output sound. Particularly, the image display apparatus 100 and the external sound output device 400 connected wirelessly may simultaneously output sound.

Meanwhile, the display 180 may be implemented with any one of various panels. For example, the display 180 may be any one of a liquid crystal display (LCD) panel, an organic light emitting diode (OLED) panel, an inorganic light emitting diode (LED) panel, and the like.

Meanwhile, the image display apparatus 100 shown in FIG. 1 may be a TV, a monitor, a tablet PC, a mobile device, etc.

FIG. 2 is a block diagram of the image display apparatus shown in FIG. 1.

Referring to FIG. 2, the image display apparatus 100 according to an embodiment of the present disclosure may include an image receiver 105, an external device interface 130, a memory 140, a user input interface 150, a sensor device 1220 (see FIG. 12), a signal processing device 170, a display 180, and an audio output device 185.

The image receiver 105 may comprise a tuner device 110, a demodulator 120, a network interface 135, and an external device interface 130.

Unlike FIG. 2, the image receiver 105 may comprise only the tuner device 110, the demodulator 120, and the external device interface 130. That is, the image receiver 105 may not include the network interface 135.

The tuner device 110 selects a Radio Frequency (RF) broadcast signal corresponding to a channel selected by a user or an RF broadcast signal corresponding to each of pre-stored channels from among a plurality of RF broadcast signals received through an antenna (not shown). In addition, the tuner device 110 downconverts the selected RF broadcast signal into an Intermediate Frequency (IF) signal or a baseband Audio/Video (A/V) signal.

For example, if the selected RF broadcast signal is a digital broadcast signal, the tuner device 110 downconverts the selected RF broadcast signal into a digital IF signal. On the other hand, if the selected RF broadcast signal is an analog broadcast signal, the tuner device 110 downconverts the selected RF broadcast signal into an analog baseband A/V signal (CVBS/SIF). That is, the tuner device 110 may process a digital broadcast signal or an analog broadcast signal. The analog baseband A/V signal, CVBS/SIF from the tuner device 110 may be provided directly to the signal processing device 170.

Meanwhile, the tuner device 110 may comprise a plurality of tuners for receiving broadcast signals of a plurality of channels, or a single tuner for simultaneously receiving broadcast signals of a plurality of channels.

The demodulator 120 receives the digital IF signal from the tuner device 110 and demodulates the digital IF signal.

The demodulator 120 may perform demodulation and channel decoding on the digital IF signal, thereby obtaining a stream signal TS. The stream signal TS may be a signal in which an image signal, an audio signal and/or a data signal are multiplexed.

The stream signal output from the demodulator 120 may be input to the signal processing device 170 and then subjected to demultiplexing and A/V signal processing. The signal processing device 170 outputs the processed video and audio signals to the display 180 and the audio output device 185, respectively.

The external device interface 130 may transmit and receive data to and from a connected external device (not shown) such as a set-top box. For this purpose, the external device interface 130 may comprise an A/V Input/Output (I/O) device (not shown).

The external device interface 130 may be connected to an external device, wirelessly or by wire, such as a Digital Versatile Disk (DVD) player, a Blu-ray Disk (BD) player, a game console, a camera, a camcorder, a computer (e.g., a laptop computer), or a set-top box. Then, the external device interface 130 may transmit and receive signals to and from the external device.

The A/V input and output device may receive audio and image signals from an external device, and a wireless communicator (not shown) may conduct short-range wireless communication with another electronic device.

The external device interface 130 may exchange data with a nearby mobile terminal 600 through the wireless communicator (not shown). Particularly, the external device interface 130 may receive device information, executed application information, an application image, and so on from the mobile terminal 600 in a mirroring mode.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

Meanwhile, the network interface 135 may comprise a wireless communicator (not shown).

The memory 140 may store programs necessary for the signal processing device 170 to process signals and control, and may also store a signal-processed image, audio, or data signal.

In addition, the memory 140 may also temporarily store an audio, video or data signal received from the external device interface 130. The memory 140 may store information about broadcast channels by the channel-add function.

While the memory 140 is shown in FIG. 2 as configured separately from the signal processing device 170, to which the present disclosure is not limited, the memory 140 may be incorporated into the signal processing device 170.

The user input interface 150 transmits a signal received from the user to the signal processing device 170 or transmits a signal received from the signal processing device 170 to the user.

For example, the user input interface 150 may transmit/receive user input signals, such as a power-on/off signal, a channel selection signal, a screen setting signal, etc., to/from a remote controller 200, may provide the signal processing device 170 with user input signals received from local keys (not shown), such as inputs of a power key, a channel key, a volume key, a setting value, etc., may transmit a user input signal, received from the sensor device 1220 (see FIG. 12) that senses a user gesture, to the signal processing device 170, or may transmit a signal received from the signal processing device 170 to the sensor device 1220 (see FIG. 12).

The signal processing device 170 may demultiplex a stream signal received from the tuner device 110, the demodulator 120, the network interface 135, or the external device interface 130 into a number of signals, and process the demultiplexed signals into audio and image signals.

For example, the signal processing device 170 may receive a broadcast signal or an HDMI signal received by the image receiver 105, and output a processed image signal by processing the received broadcast signal or the received HDMI signal.

The image signal processed by the signal processing device 170 may be displayed as an image corresponding to the image signal on the display 180. The image signal processed by the signal processing device 170 may also be transmitted to an external output device through the external device interface 130.

The audio signal processed by the signal processing device 170 may be output to the audio output device 185. Also, the audio signal processed by the signal processing device 170 may be transmitted to an external output device through the external device interface 130.

Although not illustrated in FIG. 2, the signal processing device 170 may comprise a Demultiplexer (DEMUX) and a video processor, which will be described later with reference to FIG. 3. That is, the signal processing device 170 may process various types of signals and accordingly may be implemented in the form of a system On Chip (SOC). It will be described in more detail with reference to FIG. 3.

In addition, the signal processing device 170 may provide overall control to the image display apparatus 100. For example, the signal processing device 170 may control the tuner device 110 to select an RF broadcast signal corresponding to a user-selected channel or a pre-stored channel.

The signal processing device 170 may control the image display apparatus 100 according to a user command received through the user input interface 150 or according to an internal program.

The signal processing device 170 may control the display 180 to display an image. The image displayed on the display 180 may be a Two-Dimensional (2D) or Three-Dimensional (3D) still image or video.

The signal processing device 170 may control a particular 2D object in the image displayed on the display 180. For example, the particular 2D object may be at least one of a linked Web page (e.g., from a newspaper or a magazine), an Electronic Program Guide (EPG), a menu, a widget, an icon, a still image, a video, or text.

The signal processing device 170 may locate the user based on an image captured by a camera device (not shown). For example, the signal processing device 170 may determine the distance (a z-axis coordinate) between the user and the image display apparatus 100. In addition, the signal processing device 170 may determine x-axis and y-axis coordinates corresponding to the position of the user on the display 180.

The display 180 generates drive signals by converting a processed image signal, a processed data signal, an On Screen Display (OSD) signal, and a control signal received from the signal processing device 170 or an image signal, a data signal, and a control signal received from the external device interface 130.

Meanwhile, the display 180 may also be a touch screen that can be used not only as an output device but also as an input device.

The audio output device 185 may receive a processed audio signal from the signal processing device 170 and output the received audio signal as voice.

The camera device (not shown) captures a user. The camera device may comprise, but not limited to, a single camera. When needed, the camera device may comprise a plurality of cameras. Image information captured by the camera device may be provided to the signal processing device 170.

The signal processing device 170 may sense a user's gesture from a captured image received from the camera device (not shown) or from signals received from the sensor device 1220 (see FIG. 12) alone or in combination.

A power supply 190 supplies power across the whole image display apparatus 100. Particularly, the power supply 190 may supply power to the signal processing device 170 which may be implemented as a System On Chip (SOC), the display 180 for displaying an image, the audio output device 185 for outputting an audio signal, and so on.

Specifically, the power supply 190 may comprise a converter for converting Alternating Current (AC) power to Direct Current (DC) power, and a DC/DC converter for converting the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive an image signal, an audio signal and/or a data signal from the user input interface 150 and may output the received signal as an image or sound.

The above-described image display apparatus 100 may be a fixed or mobile digital broadcast receiver.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
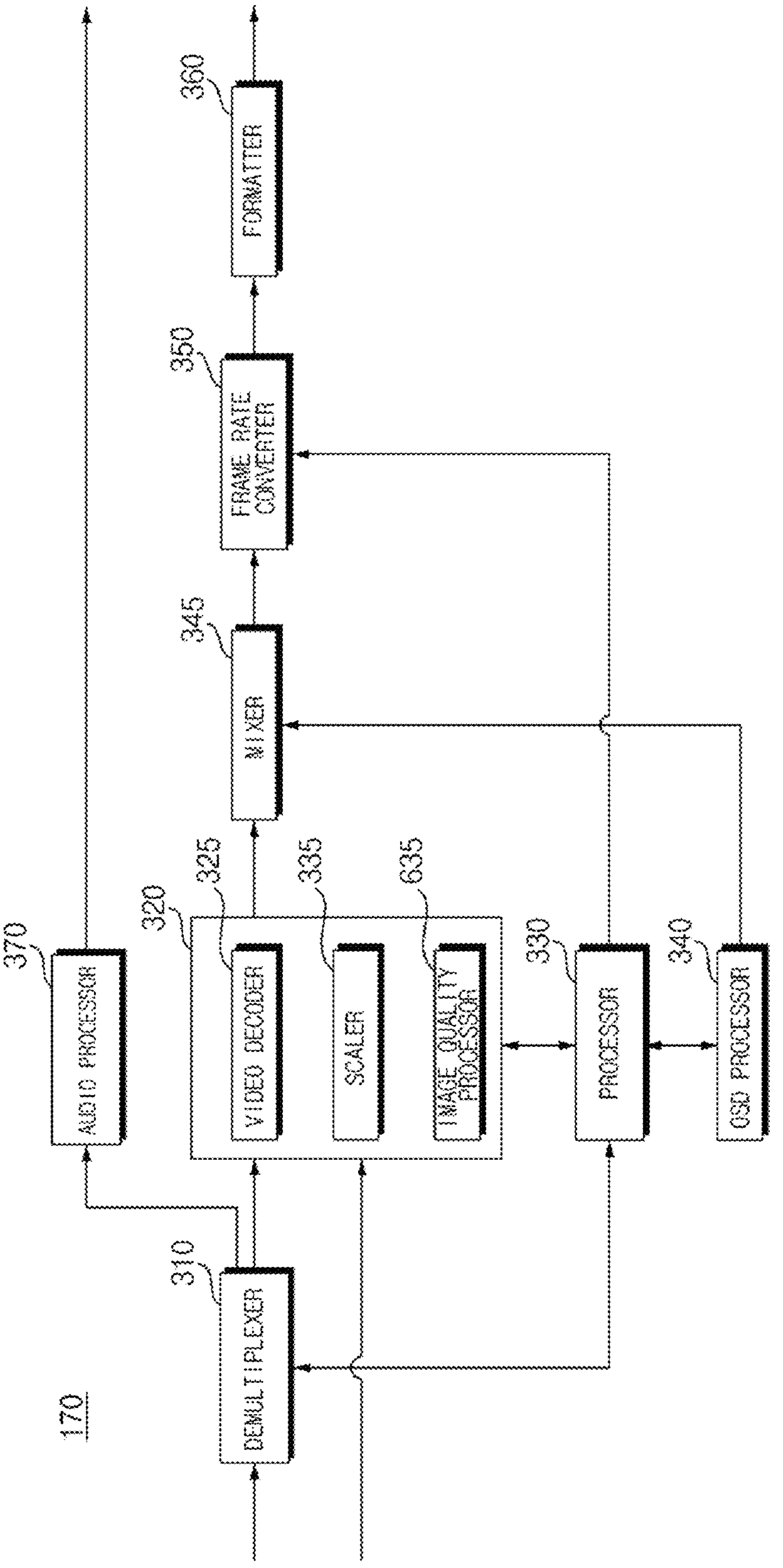
FIG. 3 is an example of an internal block diagram of a signal processing device of FIG. 2.

FIG. 3 is a block diagram of the signal processing device illustrated in FIG. 2.

Referring to FIG. 3, the signal processing device 170 may comprise a DEMUX 310, an image processor 320, a processor 330, and an audio processor 370. The signal processing device 170 may further comprise a data processor (not shown).

The DEMUX 310 demultiplexes an input stream. For example, the DEMUX 310 may demultiplex an MPEG-2 TS into an image signal, an audio signal, and a data signal. The input stream signal may be received from the tuner device 110, the demodulator 120, or the external device interface 130.

The image processor 320 may perform signal processing based on a received image. For example, the image processor 320 may perform image processing based on an image signal demultiplexed by the DEMUX 310.

To this end, the image processor 320 may comprise a video decoder 325, a scaler 335, an image quality processor 635, a video encoder (not shown), an OSD processor 340, a Fame Rate Converter (FRC) 350, a formatter 360, etc.

The video decoder 325 decodes the demultiplexed image signal, and the scaler 335 scales resolution of the decoded image signal so that the image signal may be displayed on the display 180.

The video decoder 325 may be provided with decoders that operate in conformance to various standards. For example, the video decoder 325 may comprise, for example, an MPEG-2 decoder, an H.264 decoder, a 3D video decoder for a color image, a depth image, a decoder for multi-view images, and so on.

The scaler 335 may scale a received image signal which is decoded by the video decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the video decoder 325.

For example, the image quality processor 635 may reduce noise of a received image signal, extend resolution of grayscale of the received image signal, enhance image resolution, perform High Dynamic Range (HDR)-based signal processing, change a frame rate, or perform image quality processing to corresponding to characteristics of a panel.

The OSD processor 340 generates an OSD signal autonomously or according to a user input. For example, the OSD processor 340 may generate signals by which a variety of information is displayed as graphics or text on the display 180, according to user input signals. The OSD signal may comprise various data such as a User Interface (UI), a variety of menus, widgets, and icons. The generated OSD signal may comprise a 2D or 3D object.

Further, the OSD processor 340 may generate a pointer to be displayed on the display 180 based on a pointing signal received from the remote controller 200. Especially, the pointer may be generated from a pointing signal processing device (not shown), which may reside in the OSD processor 340. Obviously, the pointing signal processing device may be configured separately from the OSD processor 240.

The FRC 350 may change the frame rate of the received image signal or simply output the image signal without frame rate conversion.

The formatter 360 may change the format of a received image signal to an image signal to be displayed on the display.

Particularly, the formatter 360 may change the format of a received image signal to correspond to characteristics of a display panel.

Meanwhile, the formatter 360 may change the format of an image signal. For example, the formatter 360 may change the format of a 3D image signal to one of various 3D formats such as a side by side format, a top/down format, a frame sequential format, an interlaced format, and a checker format.

The processor 330 may control overall operations in the image display apparatus 100 or the signal processing device 170.

For example, the processor 330 may control the tuner device 110 to tune to an RF broadcast signal corresponding to a user-selected channel or a pre-stored channel.

The processor 330 may control the image display apparatus 100 according to a user command received through the user input interface 150 or according to an internal program.

In addition, the processor 330 may control data transmission through the network interface 135 or the external device interface 130.

In addition, the processor 330 may control operations of the DEMUX 310 and the image processor 320 in the signal processing device 170.

The audio processor 370 of the signal processing device 170 may process the demultiplexed audio signal. For the audio signal processing, the audio processor 370 may have a plurality of decoders.

The audio processor 370 of the signal processing device 170 may also adjust the bass, treble, and volume of the audio signal.

The data processor (not shown) of the signal processing device 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

Meanwhile, the block diagram of the signal processing device 170 illustrated in FIG. 3 is purely exemplary. Depending upon the specifications of the signal processing device 170 in actual implementation, the components of the signal processing device 170 may be combined or omitted or new components may be added.

In particular, the FRC 350 and the formatter 360 may be provided separately from the image processor 320.

Figure 4A:
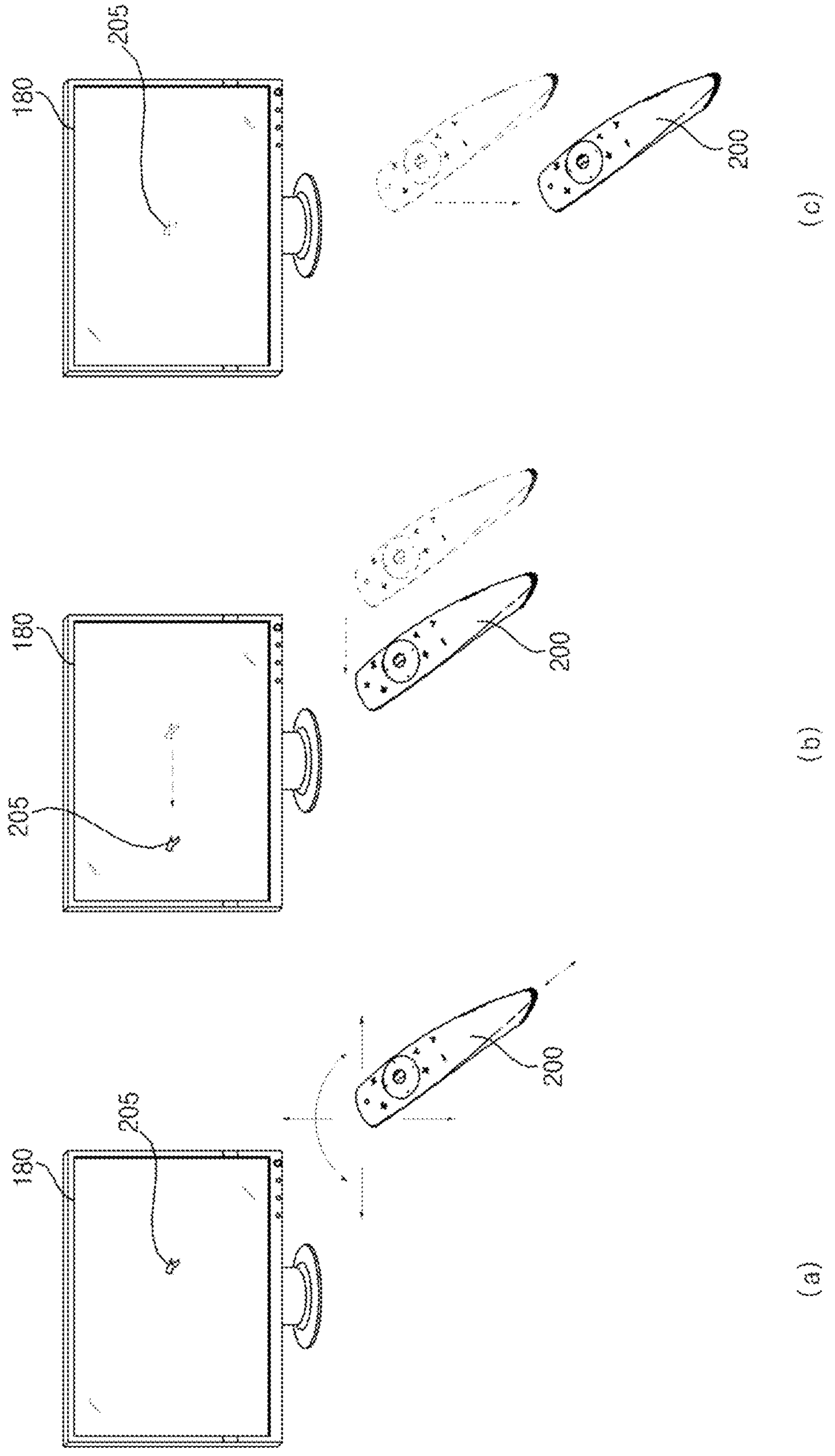
FIG. 4A is a diagram illustrating a method for controlling a remote controller illustrated in FIG. 2.

FIG. 4A is a diagram illustrating a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a remote controller 200 or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may calculate coordinates of the pointer 205 based on the motion information of the remote controller 200. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
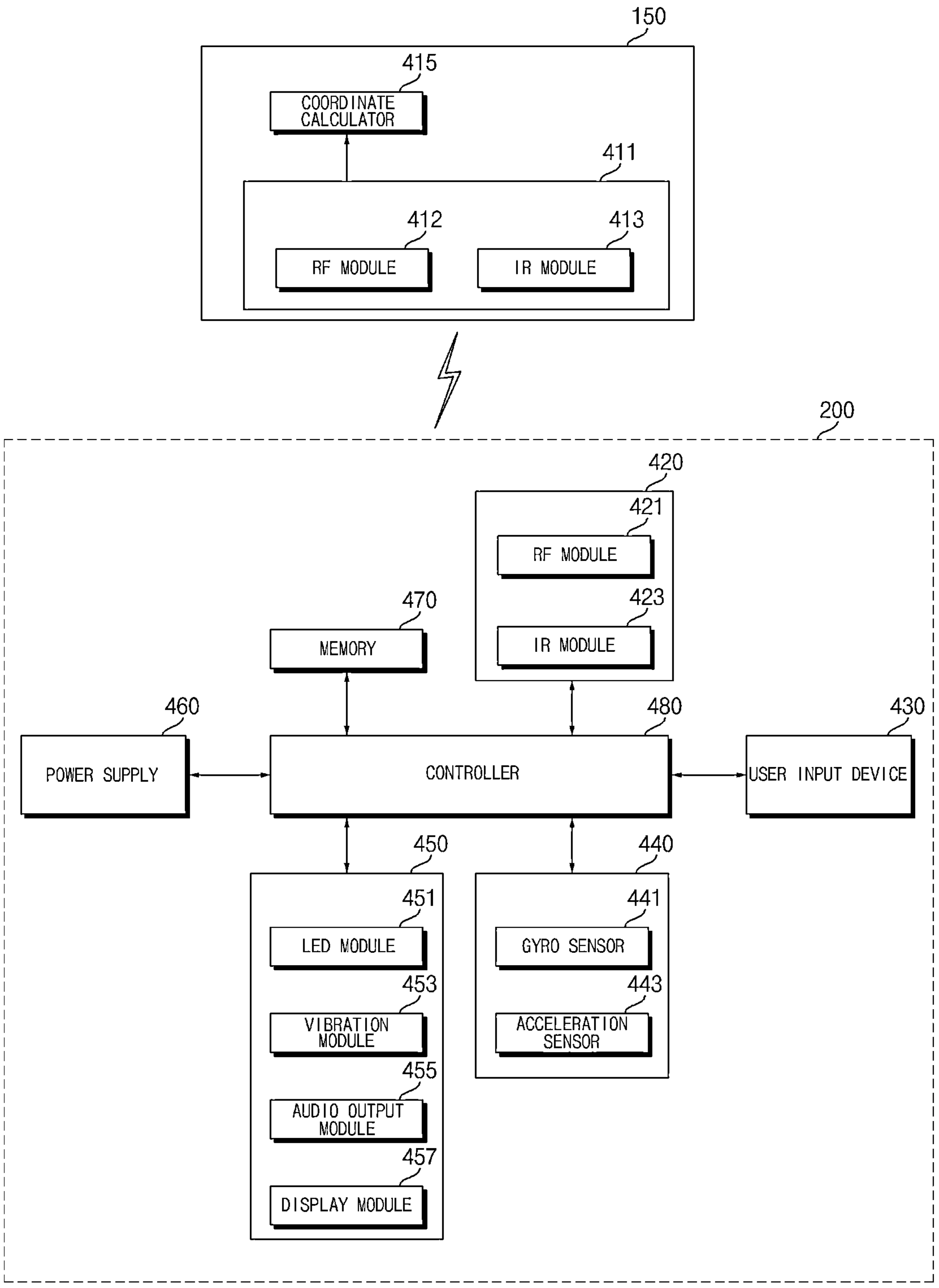
FIG. 4B is an internal block diagram of the remote controller illustrated in FIG. 2.

FIG. 4B is a block diagram of the remote controller illustrated in FIG. 2.

Referring to FIG. 4B, the remote controller 200 may comprise a wireless communicator 425, a user input device 435, a sensor device 440, an output device 450, a power supply 460, a memory 470, and a controller 480.

The wireless communicator 425 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the remote controller 200 may comprise an RF module 421 for transmitting RF signals to and/or receiving RF signals from the image display apparatus 100 according to an RF communication standard. Further, the remote controller 200 may comprise an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input device 435 may comprise a keypad, a plurality of buttons, a touch pad, or a touch screen. The user may enter commands to the image display apparatus 100 by manipulating the user input device 435. If the user input device 435 includes a plurality of hard-key buttons, the user may input various commands to the image display apparatus 100 by pressing the hard-key buttons. If the user input device 435 includes a touch screen displaying a plurality of soft keys, the user may input various commands to the image display apparatus 100 by touching the soft keys. The user input device 435 may also include various input tools other than those set forth herein, such as a scroll key and/or a jog key, which should not be construed as limiting the present disclosure.

The sensor device 440 may comprise a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor device 440 may further comprise a distance sensor for sensing the distance between the remote controller 200 and the display 180.

The output device 450 may output a video and/or audio signal corresponding to a manipulation of the user input device 435 or a signal transmitted by the image display apparatus 100. The user may easily identify whether the user input device 435 has been manipulated or whether the image display apparatus 100 has been controlled based on the video and/or audio signal output from the output device 450.

For example, the output device 450 may comprise an LED module 451 which is turned on or off whenever the user input device 435 is manipulated or whenever a signal is received from or transmitted to the image display apparatus 100 through the wireless communicator 425, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 480 may transmit a signal corresponding to a key manipulation detected from the user input device 435 or a signal corresponding to motion of the remote controller 200, as sensed by the sensor device 440, to the image display apparatus 100 through the wireless communicator 425.

The user input interface 150 of the image display apparatus 100 may comprise a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processing device 170. Then, the signal processing device 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processing device 170.

In a further example, unlike the configuration of the remote controller 200 illustrated in FIG. 17B, the coordinate calculator 415 may reside in the signal processing device 170, instead of the user input interface 150.

Figure 5:
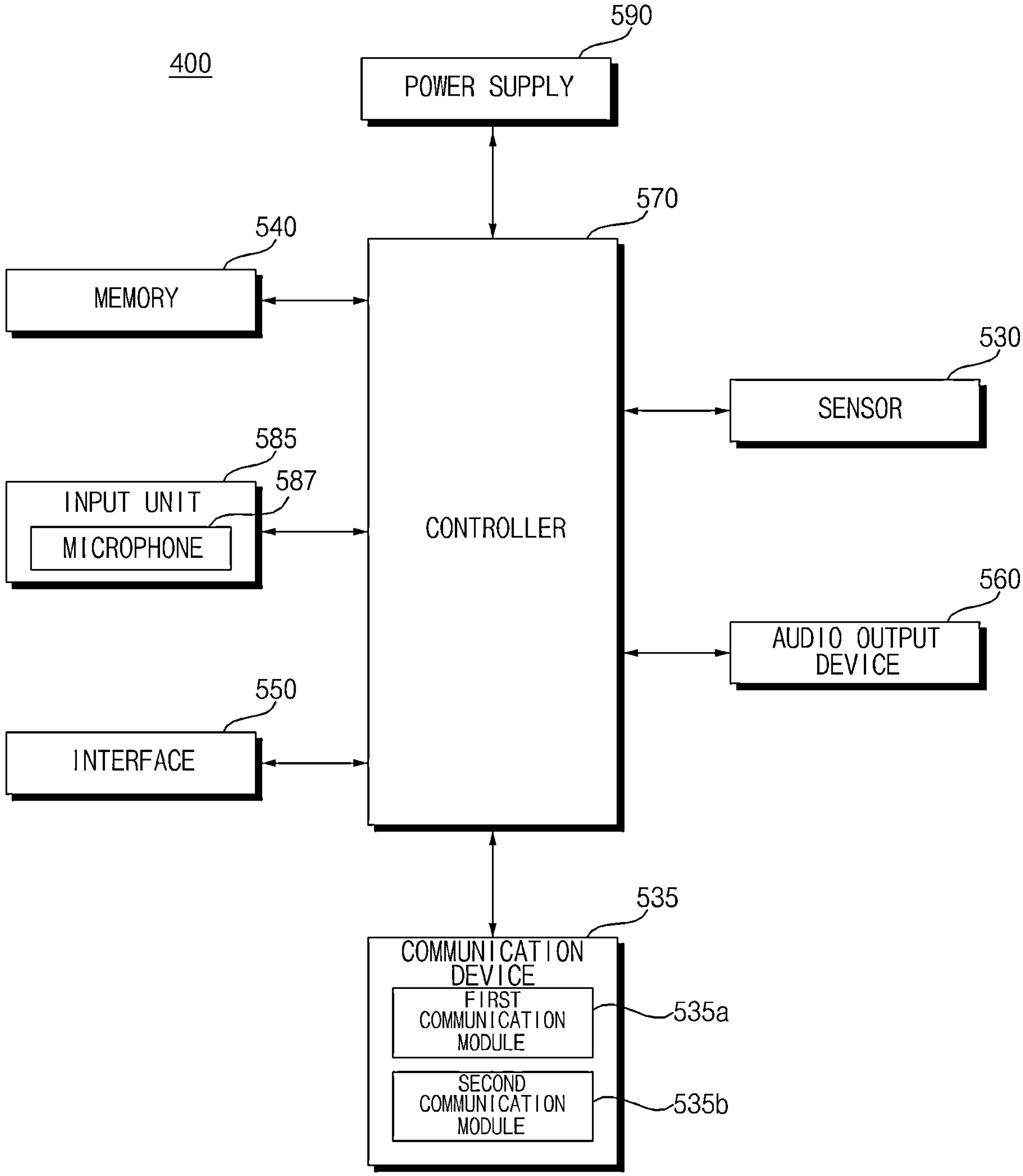
FIG. 5 is an internal block diagram of an external sound output device of FIG. 1.

FIG. 5 is an internal block diagram illustrating an external sound output device of FIG. 1.

Referring to the drawing, the external sound output device 400 may include a sensor 530, a communication device 535, a memory 540, an interface 550, an audio output device 560, a controller 570, an input device 585, and a power supply 590. When implemented in actual applications, two or more of these components may be combined into a single component as needed, or a single component may be divided into two or more components.

The sensor 530 may include an inertial sensor (not shown). The inertial sensor may include an acceleration sensor, a gyro sensor, a gravity sensor, and the like. For example, the acceleration sensor, gyro sensor, gravity sensor, and the like may include a 6-axis sensor.

The sensor 530 may output motion information of the external sound output device 400, e.g., motion information (acceleration information, angular velocity information) on x, y, and z axes, or location information, and the like.

Meanwhile, the sensor 530 may sense temperature information or current information or voltage information of the external sound output device.

Meanwhile, the communication device 535 may provide an interface for communication with an external device. To this end, the communication device 535 may include a first communication module 353*a* and a second communication module 353*b*.

For example, the first communication module 353*a* in the communication deice 535 may be a wireless communication module and may provide an interface for wireless data communication such as Bluetooth.

For example, the second communication module 353*b* in the communication device 535 may be a wireless communication module and may provide an interface for wireless data communication such as Wi-Fi, UWB, and the like.

The memory 540 may store programs for processing or controlling by the controller 570 in the external sound output device 400 and may also temporarily store input/output data.

For example, the memory 540 may store audio format information of the external sound output device 400 or audio processing time information of the external sound output device 400.

The interface 550 may provide an interface for wired data communication such as HDMI.

For example, the interface 550 may transmit the audio format information of the external sound output device 400 or the audio processing time information of the external sound output device 400 to the image display apparatus 100.

The audio output device 560 may output sound based on an audio signal processed by the controller 570 of the external sound output device 400.

The controller 570 may control the overall operation of the external sound output device 400 by controlling the operation of each component of the external sound output device 400.

Meanwhile, the controller 570 may perform signal processing on the audio signal received from an external source.

Meanwhile, the controller 570 may reproduce the audio signal received from the first communication module 535*a* or the second communication module 535*b*.

Meanwhile, the input device 585 may include a button for initializing the external sound output device 400 or operation input button, and the like.

Meanwhile, the input device 585 may include a microphone 587 for sound collection.

Meanwhile, the input device 585 may include a camera (not shown) for capturing images.

The power supply 590 may supply power required for operation of each component under the control of the controller 570.

Particularly, the power supply 590 may include a battery (not shown) that stores and outputs direct current power.

Figure 6:
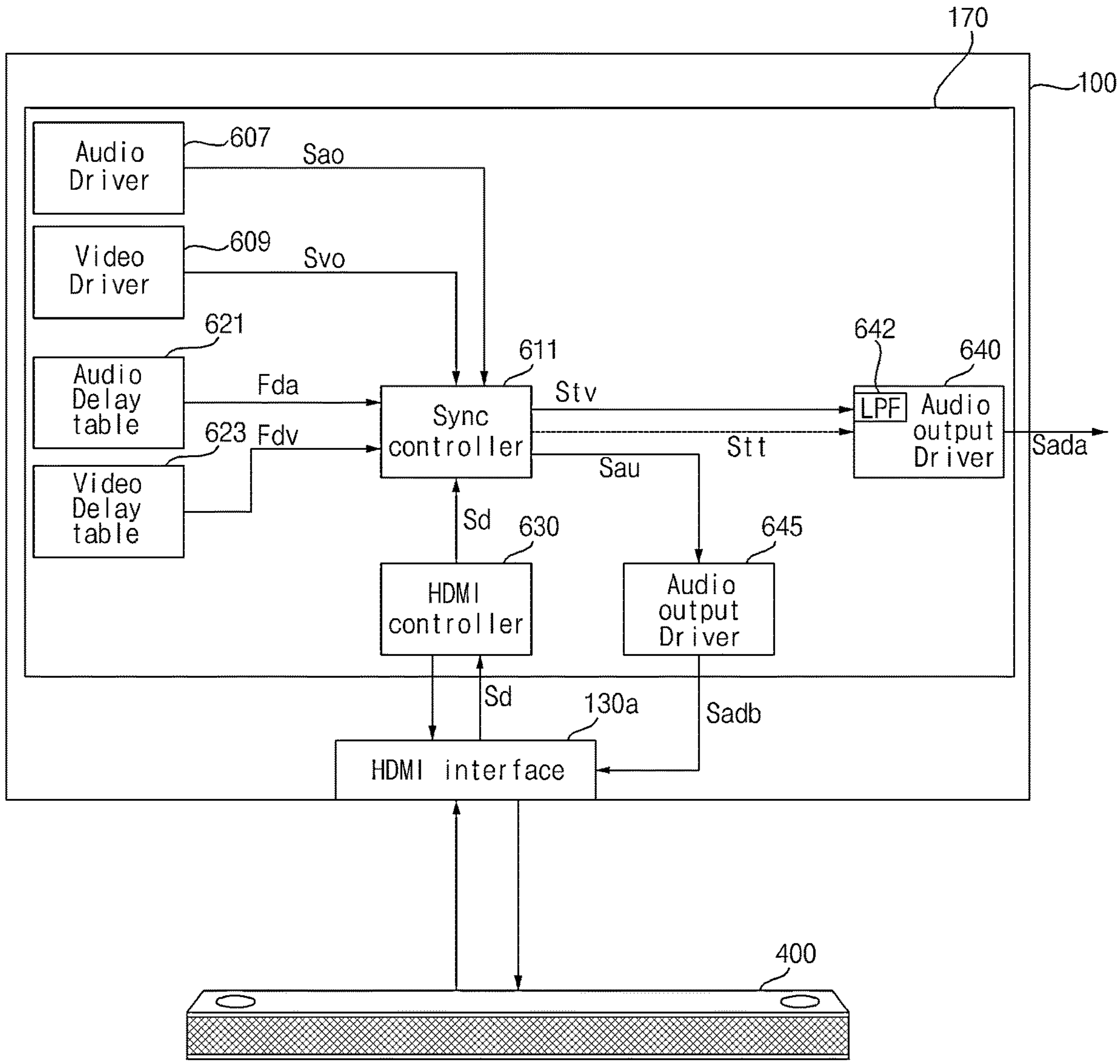
FIG. 6 is an exemplary internal block diagram of an image display apparatus according to an embodiment of the present disclosure.

FIG. 6 is an exemplary internal block diagram of an image display apparatus according to an embodiment of the present disclosure.

Referring to FIG. 6, the image display apparatus 100 includes a display 180, an audio output device 185 configured to output sound, an interface 130*a* configured to exchange data with an external sound output device 400 in a wired manner, a wireless communication device 135*a* configured to exchange data with the external sound output device 400 in a wireless manner, and a signal processing device 170.

Meanwhile, the wireless communication device 135*a* may include a first communication module (not shown) corresponding to a first communication module 535*a* in the external sound output device 400.

In this case, the first communication module (not shown) in the wireless communication device 135*a* may provide an interface, such as Bluetooth, for wireless data communication.

Meanwhile, the wireless communication device 135*a* may include a second communication module (not shown) corresponding to a second communication module 535*b* in the external sound output device 400.

In this case, the second communication module (not shown) in the wireless communication device 135*a* may provide an interface, such as Wi-Fi or Ultra-wideband (UWB), etc., for wireless data communication.

Meanwhile, the interface 130*a* may be an HDMI interface.

Meanwhile, the interface 130*a* may receive audio format information Sd from the external sound output device 400 or may receive audio processing time information according to the audio format information Sd of the external sound output device 400.

For example, the interface 130*a* may receive, from the external sound output device 400, the audio format information Sd processable by the external sound output device 400, and may transmit the received audio format information Sd to the signal processing device 170.

Meanwhile, the signal processing device 170 may receive, from the external sound output device 400, the audio format information Sd processable by the external sound output device 400, and may control an audio signal, which is based on an audio format selected from the received audio format information Sd based on an environment where the external sound output device 400 is wirelessly connected to the signal processing device 170, to the external sound output device 400. Accordingly, it is possible to stably output sound through the external sound output device 400 wirelessly connected to the image display apparatus.

Meanwhile, in a simultaneous sound output mode of the external sound output device 400 and the audio output device 185 and in a mode of wireless transmission to the external sound output device 400, the signal processing device 170 may output a first audio signal to the audio output device 185, and may be configured to wirelessly transmit a second audio signal based on a first format to the external sound output device 400, and if a number of times the external sound output device 400 requests retransmission is greater than or equal to a reference value, the signal processing device 170 may be configured to wirelessly transmit an audio signal based on a second format to the external sound output device 400.

Accordingly, it is possible to stably output sound through the external sound output device 400 wirelessly connected to the image display apparatus. Particularly, the image display apparatus 100 and the external sound output device 400 connected wirelessly may simultaneously output sound.

Meanwhile, if the number of times the external sound output device 400 requests retransmission is greater than or equal to the reference value, the signal processing device 170 may control an audio signal, which is based on the second format with a wireless data transfer rate less than the first format, to the external sound output device 400.

For example, the first format may be a DTS format, and the second format may be a two-channel PCM format.

Meanwhile, when outputting the audio signal based on the second format, the signal processing device 170 may output an audio signal based on the first format to the audio output device 185. Accordingly, it is possible to stably output sound through the external sound output device 400 wirelessly connected to the image display apparatus.

Alternatively, when outputting the audio signal based on the second format, the signal processing device 170 may output the audio signal based on the second format to the audio output device 185. Accordingly, it is possible to stably output sound through the external sound output device 400 wirelessly connected to the image display apparatus.

In the simultaneous sound output mode of the external sound output device 400 and the audio output device 185 and in the mode of wireless transmission to the external sound output device 400, the signal processing device 170 may output a first audio signal based on the first format to the audio output device 185, and may be configured to wirelessly transmit a second audio signal based on the first format to the external sound output device 400, in which if the number of times the external sound output device 400 requests retransmission is greater than or equal to the reference value, the signal processing device 170 may output a third audio signal based on the second format to the audio output device 185, and may be configured to wirelessly transmit a fourth audio signal based on the second format to the external sound output device 400. Accordingly, it is possible to stably output sound through the external sound output device 400 wirelessly connected to the image display apparatus. Particularly, the image display apparatus 100 and the external sound output device 400 connected wirelessly may simultaneously output sound.

In this case, when transmitting the second audio signal based on the first format, the signal processing device 170 may be configured to wirelessly transmit the second audio signal to the external sound output device 400 by using the second communication module (not shown) in the wireless communication device 135*a*, and when transmitting the fourth audio signal based on the second format, the signal processing device 170 may be configured to wirelessly transmit the fourth audio signal to the external sound output device 400 by using the second communication module (not shown) with a smaller wireless communication bandwidth than the first communication module (not shown). Accordingly, it is possible to stably output sound through the external sound output device 400 wirelessly connected to the image display apparatus. Particularly, the image display apparatus 100 and the external sound output device 400 connected wirelessly may simultaneously output sound.

Meanwhile, in a single sound output mode of the image display apparatus 100, the signal processing device 170 may output a fifth audio signal, and the audio output device 185 may output sound corresponding to the fifth audio signal. Accordingly, only the image display apparatus 100 may output sound.

Meanwhile, in a single sound output mode of the external sound output device 400 and in the mode of wireless transmission to the external sound output device 400, the signal processing device 170 may control an audio signal, which is based on a third format with a wireless data transfer rate greater than the first format, to the external sound output device 400.

For example, the first format may be a DTS format, and the third format may be a multi-channel PCM format.

Meanwhile, in the single sound output mode of the external sound output device 400 and in the mode of wireless transmission to the external sound output device 400, the signal processing device 170 may wirelessly transmit the audio signal based on the first format to the external sound output device 400.

Meanwhile, in the single sound output mode of the external sound output device 400 and in the mode of wireless transmission to the external sound output device 400, the signal processing device 170 may wirelessly transmit the audio signal based on the third format to the external sound output device 400, and if the number of times the external sound output device 400 requests retransmission is greater than or equal to the reference value or a second reference value, the signal processing device 170 may be configured to wirelessly transmit an audio signal based on a fourth format to the external sound output device 400.

In this case, if the number of times the external sound output device 400 requests retransmission is greater than or equal to the reference value, the signal processing device 170 may control an audio signal, which is based on a fourth format with a wireless data transfer rate less than the third format, to the external sound output device 400.

For example, the third format may be a multi-channel PCM format, and the fourth format may be a Dolby Digital format or a two-channel PCM format.

Meanwhile, after transmitting the audio signal based on the fourth format, if the number of times the external sound output device 400 requests retransmission is greater than or equal to the reference value or an allowable value, the signal processing device 170 may switch the wireless transmission mode for wireless transmission to the external sound output device 400 to a wired transmission mode, and transmit the audio signal by wire to the external sound output device 400. Accordingly, it is possible to stably output sound through the external sound output device 400 wirelessly connected to the image display apparatus.

Meanwhile, in the wireless transmission mode or the wired transmission mode and in the simultaneous sound output mode of the external sound output device 400 and the audio output device 185, the signal processing device 170 may control a first audio signal Stv based on a first additional delay time to be output to the audio output device 185 and a second audio signal Sau based on a second additional delay time to be output to the external sound output device 400. Accordingly, sound synchronization may be performed when the external sound output device 400 and the image display apparatus 100 simultaneously output sound. Particularly, by using different additional delay times, sound synchronization may be performed when the external sound output device 400 and the image display apparatus 100 simultaneously output sound.

Meanwhile, in the single sound output mode of the audio output device 185, the signal processing device 170 may output a fifth audio signal Stt to be output to the audio output device 185.

For example, in the single sound output mode of the audio output device 185, if a level of video processing time information of an input video signal is greater than a level of audio processing time information of the audio output device 185, the signal processing device 170 may control the fifth audio signal Stt based on a third additional delay time, which corresponds to a difference between the levels, to be to output to the audio output device 185. In this case, the third additional delay time is less than the first additional delay time or the second additional delay time. Accordingly, when the image display apparatus 100 solely outputs sound, sound with less delay may be output.

In another example, in the single sound output mode of the audio output device 185, if a level of video processing time information of an input video signal is lower than a level of audio processing time information of the audio output device 185, the signal processing device 170 may control a third additional delay time, which corresponds to a difference between the levels, to be added to a video signal instead of the fifth audio signal Stt. Accordingly, the additional delay time of the fifth audio signal Stt may be at level 0, and thus sound with less delay may be output when the image display apparatus 100 solely outputs sound, compared to the case of simultaneous sound output.

Meanwhile, the signal processing device 170 may include an interface controller 630 configured to control the interface 130*a*, and a delay controller 611 configured to calculate a delay time of an audio signal based on the audio format information Sd received from the interface 130*a* or the interface controller 630 or the audio processing time information of the external sound output device 400.

Meanwhile, in the simultaneous sound output mode during the wireless transmission mode or the wired transmission mode, the delay controller 611 in the signal processing device 170 may output the first audio signal, which is based on the calculated first additional delay time, to a first audio output driver 640, and may output a second audio signal, which is based on the calculated second additional delay time, to a second audio output driver 645.

Meanwhile, in the simultaneous sound output mode, the first audio output driver 640 in the signal processing device 170 may output a first audio signal Sada, having passed through a low-pass filter 642, to the audio output device 185.

Meanwhile, in the simultaneous sound output mode, the second audio output driver 645 in the signal processing device 170 may output a second audio signal Sadb, which is a full-band signal, to the interface 130*a*.

Accordingly, in the simultaneous sound output mode, the first sound which is low-pass filtered may be output from the audio output device 185, and the second sound which is a full-band sound signal may be output from the external sound output device 400.

Meanwhile, in the single sound output mode, the first audio output driver 640 in the signal processing device 170 may output a third audio signal Stt, which is a full-band signal that does not pass through the low-pass filter 642, to the audio output device 185.

Accordingly, in the single sound output mode, the third sound which is a full-band sound signal may be output from the audio output device 185.

Meanwhile, the signal processing device 170 may further include an audio driver 607 configured to process an audio signal, a video driver 609 configured to process a video signal, an audio delay table 621, and a video delay table 623.

Meanwhile, an audio signal Sao processed by the audio driver 607 may be input to the delay controller 611.

Meanwhile, a video signal Svo processed by the video driver 609 may be input to the delay controller 611.

Meanwhile, the audio delay table 621 may output, to the delay controller 611, audio processing time information FDa for the audio driver 607 according to an audio format.

In this case, the audio processing time information FDa for the audio driver 607 according to an audio format may correspond to audio processing time information for the audio output device 185.

Meanwhile, the video delay table 623 may output, to the delay controller 611, video processing time information FDv for the video driver 609 according to a video format.

Meanwhile, in the simultaneous sound output mode during the wireless transmission mode or the wired transmission mode, the delay controller 611 in the signal processing device 170 may calculate a first additional delay time of the first audio signal Stv based on the audio format information Sd of the external sound output device 400 or the audio processing time information of the external sound output device 400.

Meanwhile, in the simultaneous sound output mode, the delay controller 611 in the signal processing device 170 may calculate a first additional delay time of the first audio signal and a second additional delay time of the second audio signal based on a video processing time of an input video signal in the video driver 609, the audio processing time information according to the audio format information of the external sound output device 400, an audio processing time in the audio driver 607, and a time of output processing to the external sound output device 400.

Specifically, in the simultaneous sound output mode, the delay controller 611 in the signal processing device 170 may control the first additional delay time of the first audio signal to increase as the video processing time of the input video signal in the video driver 609 increases, or as the audio processing time according to the audio format information of the external sound output device 400 increases, or as the audio processing time in the audio driver 607 decreases, or as the time of output processing to the external sound output device 400 increases.

Meanwhile, in the simultaneous sound output mode, the delay controller 611 in the signal processing device 170 may control the second additional delay time of the second audio signal to increase as the video processing time of the input video signal in the video driver 609 increases, or as the audio processing time according to the audio format information of the external sound output device 400 decreases, or as the audio processing time in the audio driver 607 decreases, or as the time of output processing to the external sound output device 400 decreases.

Meanwhile, if the video processing time of the input video signal is greater than a sum of delays of the external sound output device 400, the delay controller 611 in the signal processing device 170 may calculate a first additional delay time and a second additional delay time based on the video processing time of an output video signal.

That is, the second additional delay time may be less than the first additional delay time. Accordingly, sound synchronized with a video signal may be output from the audio output device 185 and the external sound output device 400.

Meanwhile, if a sum of delays of the external sound output device 400 is greater than the video processing time of the input video signal, the delay controller 611 in the signal processing device 170 may calculate a first additional delay time and a second additional delay time based on the sum of delays of the external sound output device 400. Accordingly, sound synchronized with a video signal may be output from the audio output device 185 and the external sound output device 400.

Meanwhile, in the single sound output mode during the wireless transmission mode or the wired transmission mode, the delay controller 611 in the signal processing device 170 may output a fifth audio signal based on a calculated third additional delay time, while ignoring the audio format information Sd of the external sound output device 400 or the audio processing time information of the external sound output device 400.

Meanwhile, in the single sound output mode, the delay controller 611 in the signal processing device 170 may calculate a third additional delay time of the fifth audio signal based on the video processing time of the input video signal, while ignoring the audio format information Sd of the external sound output device 400 or the audio processing time information of the external sound output device 400.

Meanwhile, in the single sound output mode, the delay controller 611 in the signal processing device 170 may calculate a third additional delay time of the fifth audio signal based on the video processing time of the input video signal in the video driver 609 and the audio processing time in the audio driver 607, while ignoring the audio format information Sd of the external sound output device 400 or the audio processing time information of the external sound output device 400.

For example, in the single sound output mode, if a video processing time of the input video signal in the video driver 609 is greater than an audio processing time in the audio driver 607, the delay controller 611 in the signal processing device 170 may calculate a third additional delay time of the fifth audio signal for synchronization with the video signal.

Specifically, in the single sound output mode, if a video processing time of the input video signal in the video driver 609 is greater than an audio processing time in the audio driver 607, the delay controller 611 in the signal processing device 170 may control the third additional delay time to increase as the video processing time of the input video signal increases or as the audio processing time in the audio driver 607 decreases.

That is, in the single sound output mode, the delay controller 611 in the signal processing device 170 may calculate the third additional delay time based on the audio processing time information for the audio output device 185, and may output a third audio signal based on the calculated third additional delay time.

Meanwhile, if the external sound output device 400 is turned off during operation in the simultaneous sound output mode, the signal processing device 170 may switch to a single sound output mode in which the audio output device 185 solely outputs sound. Accordingly, it is possible to rapidly switch from the simultaneous sound output mode to the single sound output mode.

Figure 7A:
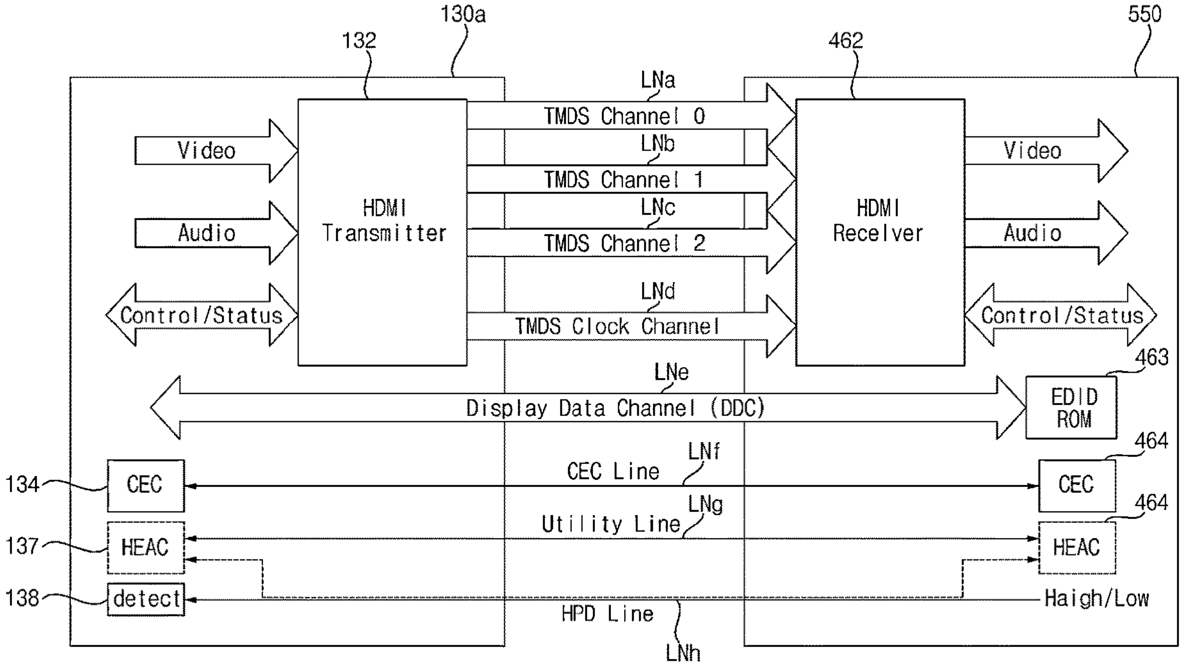
FIGS. 7A and 7B are diagrams referred to in the description of FIG. 6.
Figure 7B:
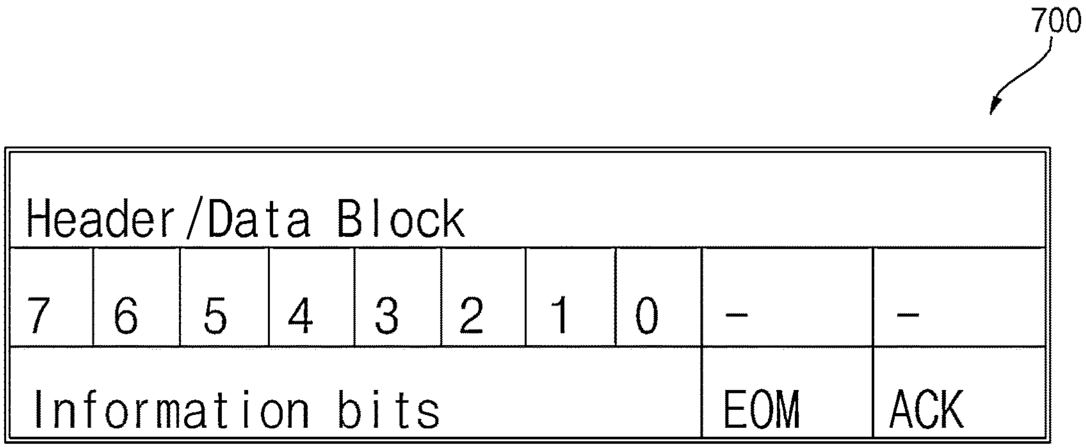

FIGS. 7A and 7B are diagrams referred to in the description of FIG. 6.

First, FIGS. 7A and 7B are diagrams illustrating an example of an interface scheme between an image display apparatus and an external sound output device.

Referring to the drawings, the image display apparatus 100 and the external sound output device 400 may perform HDMI communication as a fixed-line interface method.

In the drawings, an HDMI transmitter 132 may be included in the interface 130*a* of the image display apparatus 100, and an HDMI receiver 462 may be included in the interface 550 of the external sound output device 400.

A plurality of Transition-Minimized Differential Signaling (TMDS) lines Lna to Lnd, a Display Data Channel (DDC) line Lne, a CEC line LNf, a Utility line LNg, and an HPD line LNh may be disposed between the HDMI transmitter 132 and the HDMI receiver 462.

Meanwhile, after the external sound output device 400 is turned on, the interface 130*a* of the image display apparatus 100 may receive audio format information Sd of the external sound output device 400 or audio processing time information of the external sound output device 400 through a first transmission line LNf.

That is, the interface 130*a* of the image display device 100 may receive the audio format information Sd of the external sound output device 400 or the audio processing time information of the external sound output device 400 through the CEC line LNf.

Meanwhile, in the simultaneous sound output mode, the interface 130*a* of the image display apparatus 100 may transmit the second audio signal Sau to the external sound output device 400 through a second transmission line LNa or LNb. Accordingly, sound synchronization may be performed when the external sound output device 400 and the image display apparatus 100 simultaneously output sound.

FIG. 7B is a diagram illustrating a CEC data format of the CEC line in FIG. 7A.

Referring to the drawing, a CEC data format 700 may include a plurality of information bits, EOM, and ACK.

In accordance with a CEC data format 700 of FIG. 7B, the interface 550 of the external sound output device 400 may transmit the audio format information Sd of the external sound output device 400 or the audio processing time information of the external sound output device 400.

Figure 8A:
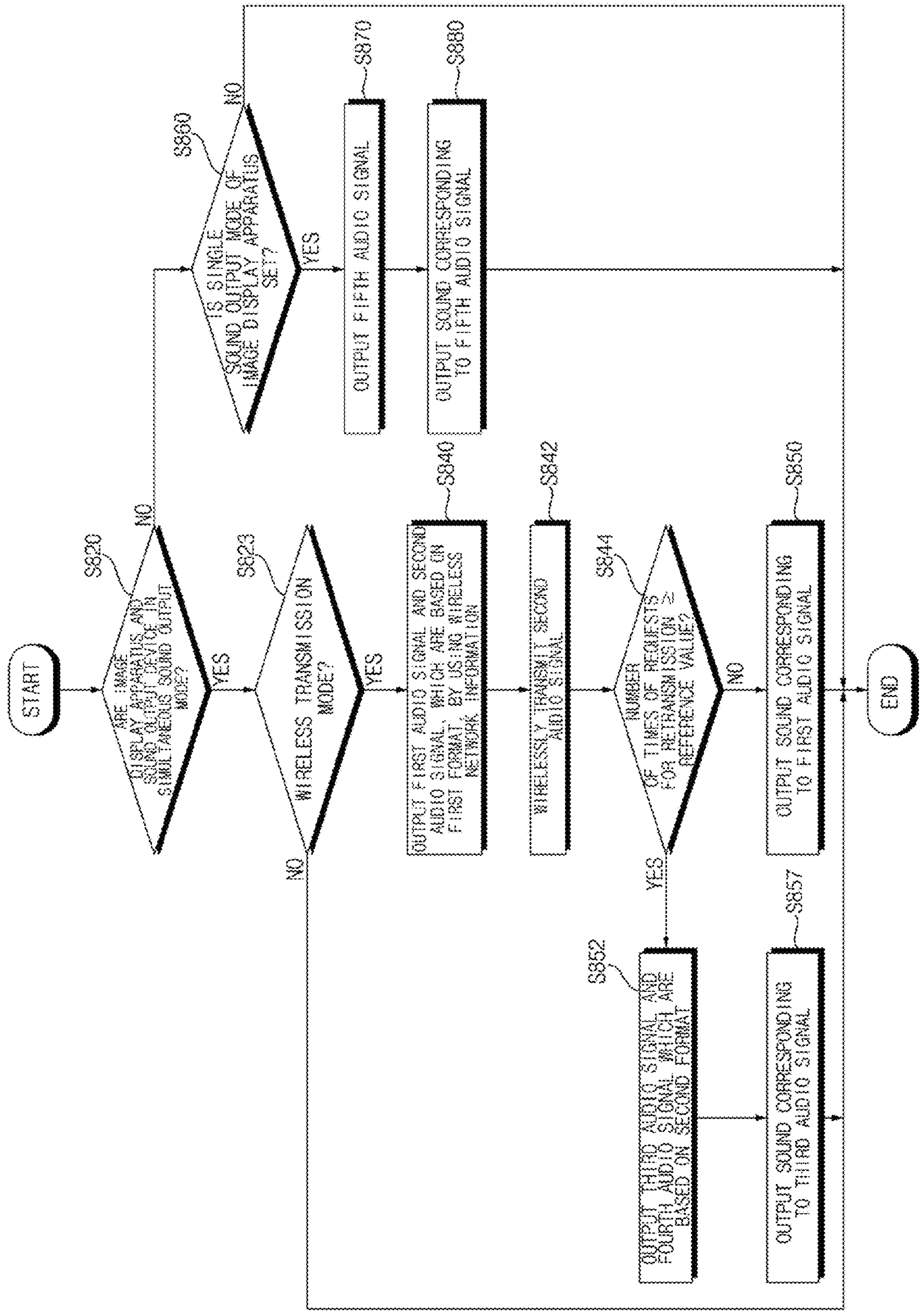
FIG. 8A is a flowchart illustrating an operating method of an image display apparatus according to an embodiment of the present disclosure.

FIG. 8A is a flowchart illustrating an operating method of an image display apparatus according to an embodiment of the present disclosure.

Referring to the drawing, the signal processing device 170 in the image display apparatus 100 according to an embodiment of the present disclosure determines whether the external sound output device 400 and the audio output device 185 are in a simultaneous sound output mode (S820).

The signal processing device 170 may determine whether the simultaneous sound output mode is set, based on an input signal while the settings screen is displayed.

Then, the signal processing device 170 determines whether the wireless transmission mode is set during the simultaneous sound output mode (S823).

The signal processing device 170 may determine whether the wireless transmission mode is set, based on an input signal while the settings screen is displayed.

Meanwhile, in the simultaneous sound output mode and in the mode of wireless transmission to the external sound output device 400, the signal processing device 170 may output the first audio signal and the second audio signal, which are based on the first format, by using wireless network information (S840).

Of the two signals, the first audio signal based on the first format may be input to the audio output device 185.

Meanwhile, the second audio signal based on the first format may be input to the wireless communication device 135*a* to be transmitted through the wireless communication device 135*a* to the external sound output device 400 which is connected wirelessly (S842).

Meanwhile, if the image display apparatus 100 and the external sound output device 400 are not connected wirelessly before operation 842 (S842), the wireless communication device 135*a* may perform wireless pairing with the external sound output device 400.

In this case, the wireless communication device 135*a* may wirelessly receive information about a wireless channel between the wireless communication device 135*a* and the external sound output device 400, and may perform wireless pairing by selecting an optimal channel from the received wireless channel information.

Meanwhile, after performing wireless pairing or during wireless pairing, the wireless communication device 135*a* may receive, from the external sound output device 400, audio format information 1010 which is processable by the external sound output device 400.

Meanwhile, the wireless communication device 135*a* receives a request for retransmission of the second audio signal from the external sound output device 400, and determines whether a number of times of the received requests for retransmission is greater than or equal to a reference value (S844).

If the number of times the external sound output device 400 requests retransmission is less than the reference value, the wireless output device 135*a* may continuously output the first audio signal and the second audio signal which are based on the first format.

Then, the audio output device 185 that receives the first audio signal may output sound corresponding to the first audio signal (S850).

At the same time, the external sound output device 400 that wirelessly receives the second audio signal may output sound corresponding to the second audio signal.

Accordingly, the external sound output device 400 and the image display apparatus 100 may stably output sound at the same time in the wireless transmission mode.

Meanwhile, in operation 844 (S844), if the number of times the external sound output device 400 requests retransmission is greater than or equal to the reference value, the signal processing device 170 may output a third audio signal and a fourth audio signal which are based on a second format with a wireless data transfer rate less than the first format (S852).

In this case, the first format may be a DTS format, and the second format may be a multi-channel PCM format.

Meanwhile, the fourth audio signal based on the second format may be input to the wireless communication device 135*a* to be transmitted through the wireless communication device 135*a* to the external sound output device 400 which is connected wirelessly (S854).

Meanwhile, the third audio signal based on the second format may be input to the audio output device 185, and the fourth audio signal based on the second format may be input to the wireless communication device 135*a* to be transmitted through the wireless communication device 135*a* to the external sound output device 400 which is connected wirelessly.

Meanwhile, the audio output device 185 that receives the third audio signal may output sound corresponding to the third audio signal (S857).

At the same time, the external sound output device 400 that receives the fourth audio signal may output sound corresponding to the fourth audio signal.

Accordingly, the external sound output device 400 and the image display apparatus 100 may stably output sound at the same time in the wireless transmission mode.

Meanwhile, after transmitting the audio signal based on the fourth format, if the number of times the external sound output device 400 requests retransmission is greater than or equal to the reference value or an allowable value, the signal processing device 170 may switch the mode of wireless transmission to the external sound output device 400 to a wired transmission mode, and transmit the audio signal by wire to the external sound output device 400.

In this case, the simultaneous sound output mode may be performed in the wired transmission mode. Accordingly, the external sound output device 400 may stably output sound.

Meanwhile, in operation 820 (S820), if the simultaneous sound output mode is not performed, the signal processing device 170 determines whether a single sound output mode of the image display apparatus 100 is set (S860).

Then, if the single sound output mode of the image display apparatus 100 is set, the signal processing device 170 may output a fifth audio signal (S870).

The fifth audio signal may be input to the audio output device 185, and the audio output device 185 may output sound corresponding to the fifth audio signal (S880). Accordingly, the image display apparatus 100 may solely output sound.

Meanwhile, the fifth audio signal may have a format other than the first format.

Meanwhile, unlike the drawing, the signal processing device 170 may also determine whether the single sound output mode of the external sound output device 400 is set.

The signal processing device 170 determines whether the single sound output mode of the external sound output device 400 and the mode of wireless transmission to the external sound output device 400 are set, and if so, the signal processing device 170 may control the audio signal, which is based on the third format with a wireless data transfer rate greater than the first format, to the external sound output device 400. Accordingly, it is possible to stably output sound through the external sound output device 400 wirelessly connected to the image display apparatus.

Alternatively, in the single sound output mode of the external sound output device 400 and in the wireless transmission mode of the external sound output device 400, the signal processing device 170 may wirelessly transmit the audio signal based on the first format to the external sound output device 400. Accordingly, it is possible to stably output sound through the external sound output device 400 wirelessly connected to the image display apparatus.

Meanwhile, in the mode of wireless transmission to the external sound output device 400, the signal processing device 170 may control an audio signal, which is based on an audio format processable by the external sound output device 400, to the external sound output device 400.

That is, in the single sound output mode or the simultaneous sound output mode of the external sound output device 400 and in the mode of wireless transmission to the external sound output device 400, the signal processing device 170 may control an audio signal, which is based on an audio format processable by the external sound output device 400, to the external sound output device 400. Accordingly, it is possible to stably output sound through the external sound output device 400 wirelessly connected to the image display apparatus.

Meanwhile, in the single sound output mode of the external sound output device 400 and the mode of wireless transmission to the external sound output device 400, the signal processing device 170 may wirelessly transmit the audio signal based on the third format to the external sound output device 400, and if the number of times the external sound output device 400 requests retransmission is greater than or equal to the reference value or a second reference value, the signal processing device 170 may be configured to wirelessly transmit the audio signal based on the fourth format to the external sound output device 400. Accordingly, it is possible to stably output sound through the external sound output device 400 wirelessly connected to the image display apparatus.

Meanwhile, after transmitting the audio signal based on the fourth format, if the number of times the external sound output device 400 requests retransmission is greater than or equal to the reference value or an allowable value, the signal processing device 170 may switch the mode of wireless transmission to the external sound output device 400 to a wired transmission mode, and transmit the audio signal by wire to the external sound output device 400. In this case, the single sound output mode may be performed in the wired transmission mode. Accordingly, it is possible to stably output sound through the external sound output device 400 wirelessly connected to the image display apparatus.

Meanwhile, unlike the drawing, after transmitting the audio signal based on the second format, if the number of times the external sound output device 400 requests retransmission is greater than or equal to the reference value or the allowable value, the signal processing device 170 may switch the mode of wireless transmission to the external sound output device 400 to a wired transmission mode, and transmit the audio signal by wire to the external sound output device 400. Accordingly, the external sound output device 400 may transmit a signal by wire or wirelessly. Further, the external sound output device 400 may stably output sound.

Meanwhile, the signal processing device 170 may control a first delay added to the first audio signal, in the simultaneous sound output mode of the external sound output device 400 and the audio output device 185 and in the mode of wireless transmission to the external sound output device 400, to be greater than a second delay added to the first audio signal, in the simultaneous sound output mode of the external sound output device 400 and the audio output device 185 and in the mode of wired transmission to the external sound output device 400. Accordingly, it is possible to stably output sound through the external sound output device 400 wirelessly connected to the image display apparatus.

Meanwhile, based on content displayed on the display 180, the signal processing device 170 may change a format of an audio signal transmitted wirelessly to the external sound output device 400. Accordingly, it is possible to stably output sound through the external sound output device 400 wirelessly connected to the image display apparatus.

Figure 8B:
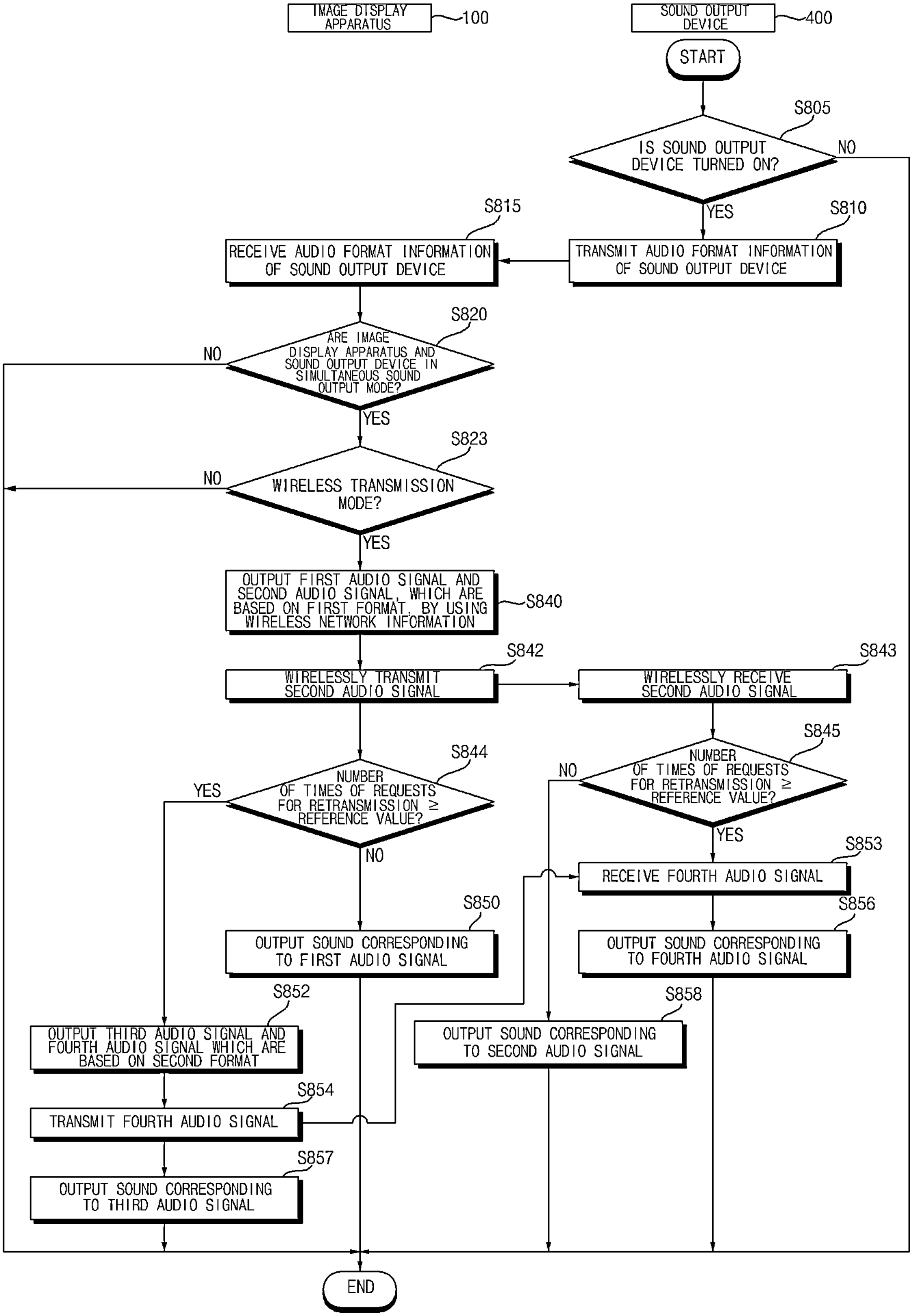
FIG. 8B is a flowchart illustrating an operating method of an image display apparatus according to another embodiment of the present disclosure.

FIG. 8B is a flowchart illustrating an operating method of an image display apparatus according to another embodiment of the present disclosure.

Referring to the drawing, when the external sound output device 400 is turned on (S805), the interface 550 of the external sound output device 400 may transmit audio format information Sd processable by the external sound output device 400, or audio processing time information of the external sound output device 400 (S810).

In response thereto, the interface 130*a* in the image display apparatus 100 may receive the audio format information Sd processable by the external sound output device 400, or the audio processing time information of the external sound output device 400 (S815).

Then, the interface 130*a* in the image display apparatus 100 may transmit the audio format information Sd, processable by the external sound output device 400, to the signal processing device 170.

Then, the signal processing device 170 determines whether the external sound output device 400 and the audio output device 185 are in a simultaneous sound output mode (S820).

The signal processing device 170 may determine whether the simultaneous sound output mode is set while the settings screen is displayed.

Then, the signal processing device 170 determines whether the wireless transmission mode is set during the simultaneous sound output mode (S823).

Meanwhile, in the simultaneous sound output mode and in the mode of wireless transmission to the external sound output device 400, the signal processing device 170 may output a first audio signal and a second audio signal, which are based on the first format, by using wireless network information (S840).

That is, the signal processing device 170 may receive, from the external sound output device 400, audio format information 1010 which is processable by the external sound output device 400, and may control an audio signal, which is based on an audio format selected from the received audio format information 1010 based on an environment where the external sound output device 400 is wirelessly connected to the signal processing device 170, to the external sound output device 400.

Meanwhile, the first audio signal based on the first format is input to the audio output device 185, and the second audio signal based on the first format is input to the wireless communication device 135*a*, such that the first and second audio signals may be transmitted through the wireless communication device 135*a* to the external sound output device 400 which is connected wirelessly (S842).

In response thereto, the external sound output device 400 may wirelessly receive the second audio signal based on the first format (S843), and may output sound corresponding to the second audio signal (S858).

Meanwhile, the wireless communication device 135*a* receives a request for retransmission of the second audio signal from the external sound output device 400, and determines whether a number of times of the received requests for retransmission is greater than or equal to a reference value (S844).

If the number of times the external sound output device 400 requests retransmission is less than the reference value, the wireless output device 135*a* may continuously output the first audio signal and the second audio signal which are based on the first format.

Then, the audio output device 185 that receives the first audio signal may output sound corresponding to the first audio signal (S850).

At the same time, the external sound output device 400 that receives the second audio signal may output sound corresponding to the second audio signal.

Accordingly, the external sound output device 400 and the image display apparatus 100 may stably output sound at the same time in the wireless transmission mode.

Meanwhile, in operation 844 (S844), if the number of times the external sound output device 400 requests retransmission is greater than or equal to the reference value, the signal processing device 170 may output a third audio signal and a fourth audio signal which are based on a second format with a wireless data transfer rate less than the first format (S852).

Meanwhile, the fourth audio signal based on the second format may be input to the wireless communication device 135*a* to be transmitted through the wireless communication device 135*a* to the external sound output device 400 which is connected wirelessly (S854).

Meanwhile, the third audio signal based on the second format is input to the audio output device 185, and the fourth audio signal based on the second format is input to the wireless communication device 135*a*, such that the third and fourth audio signals may be transmitted through the wireless communication device 135*a* to the external sound output device 400 which is connected wirelessly.

In response thereto, the external sound output device 400 may wirelessly receive the fourth audio signal based on the second format (S853), and may output sound corresponding to the fourth audio signal (S856). Accordingly, the external sound output device 400 and the image display apparatus 100 may stably output sound at the same time in the wireless transmission mode.

FIGS. 9A to 9E are diagrams illustrating various examples of a sound settings screen.

Figure 9A:
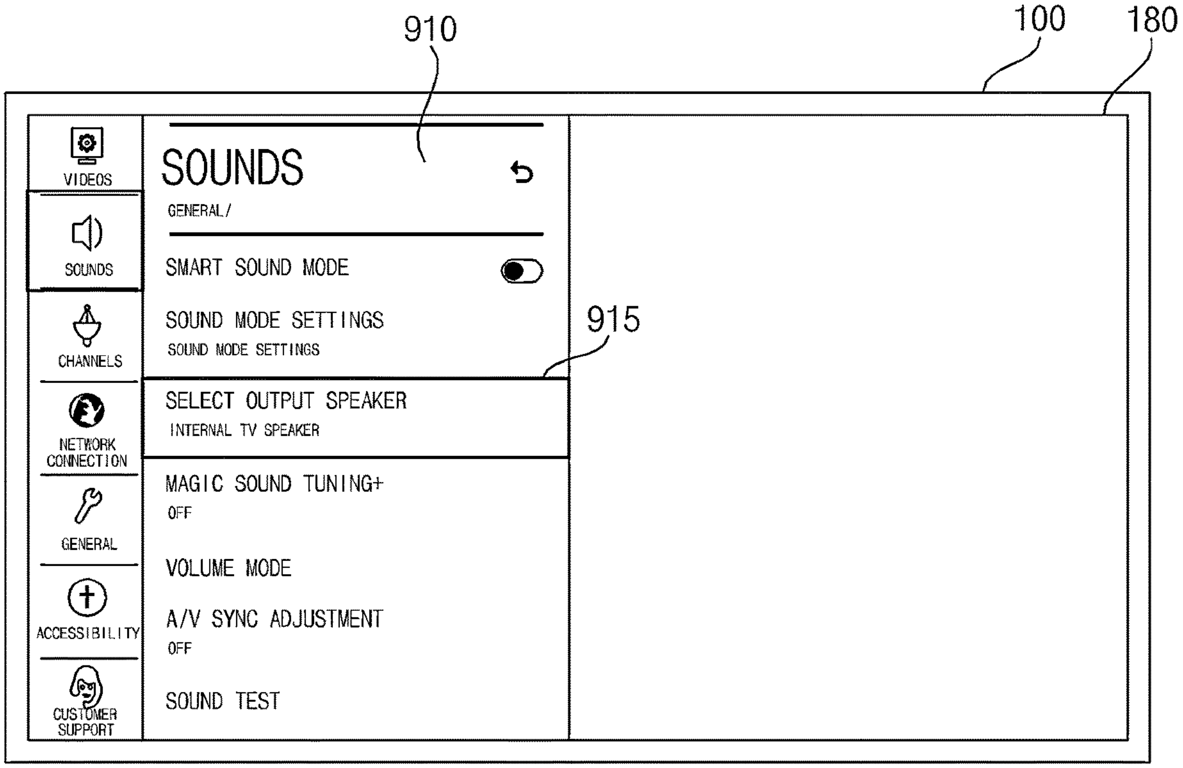
FIGS. 9A to 13B are diagrams referred to in the description of FIGS. 8A and 8B.

Referring to FIGS. 9A to 9E, the signal processing device 170 may control a sound settings screen 910 as illustrated in FIG. 9A to be displayed based on an input signal of a remote controller 200 and the like.

The sound settings screen 910 may include a sound mode setting item, an output speaker selection item 915, a sync adjustment item, and the like.

Figure 9B:
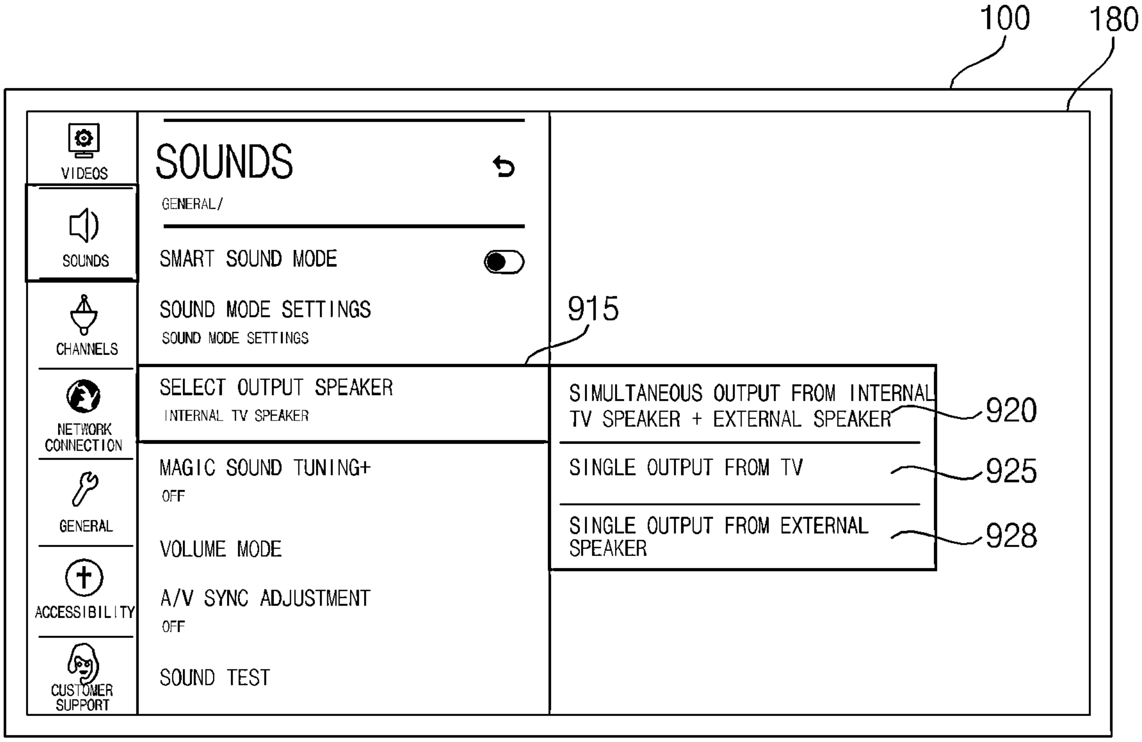

If the output speaker selection item 915 is selected, the signal processing device 170 may perform control to display an item 920 for simultaneous sound output, an item 925 for single sound output from the image display apparatus, and an item 928 for single sound output from the external sound output device, as illustrated in FIG. 9B.

Figure 9C:
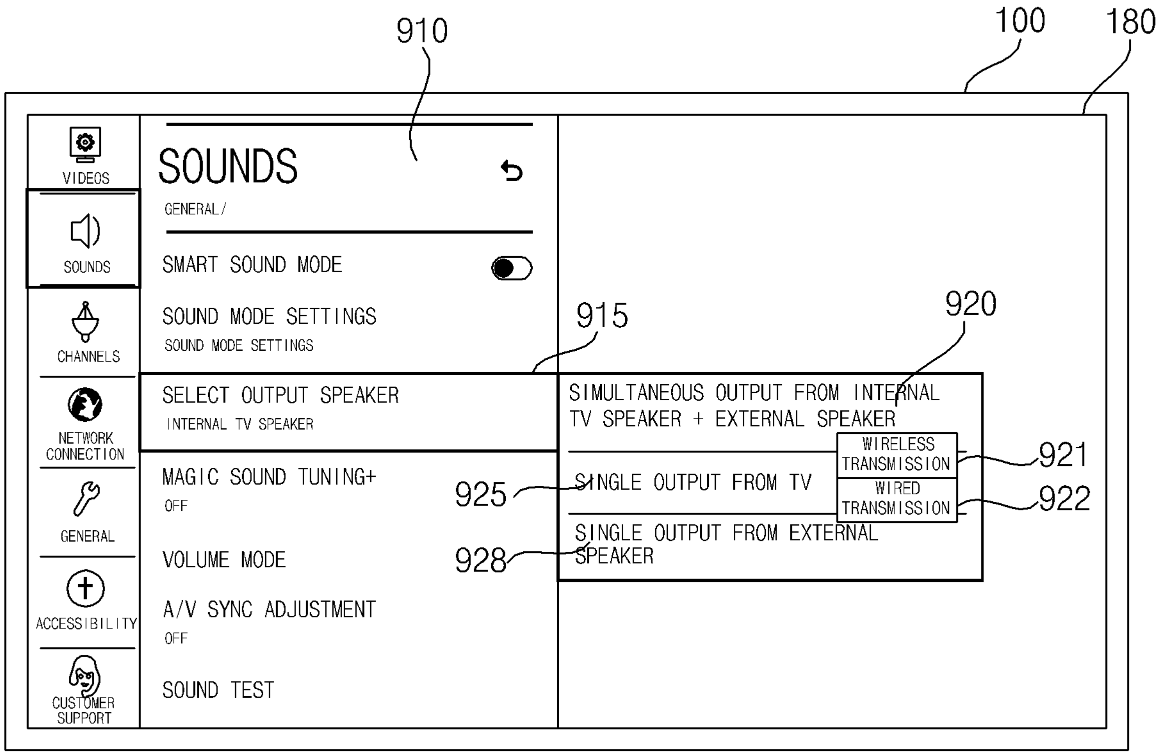
Figure 9D:
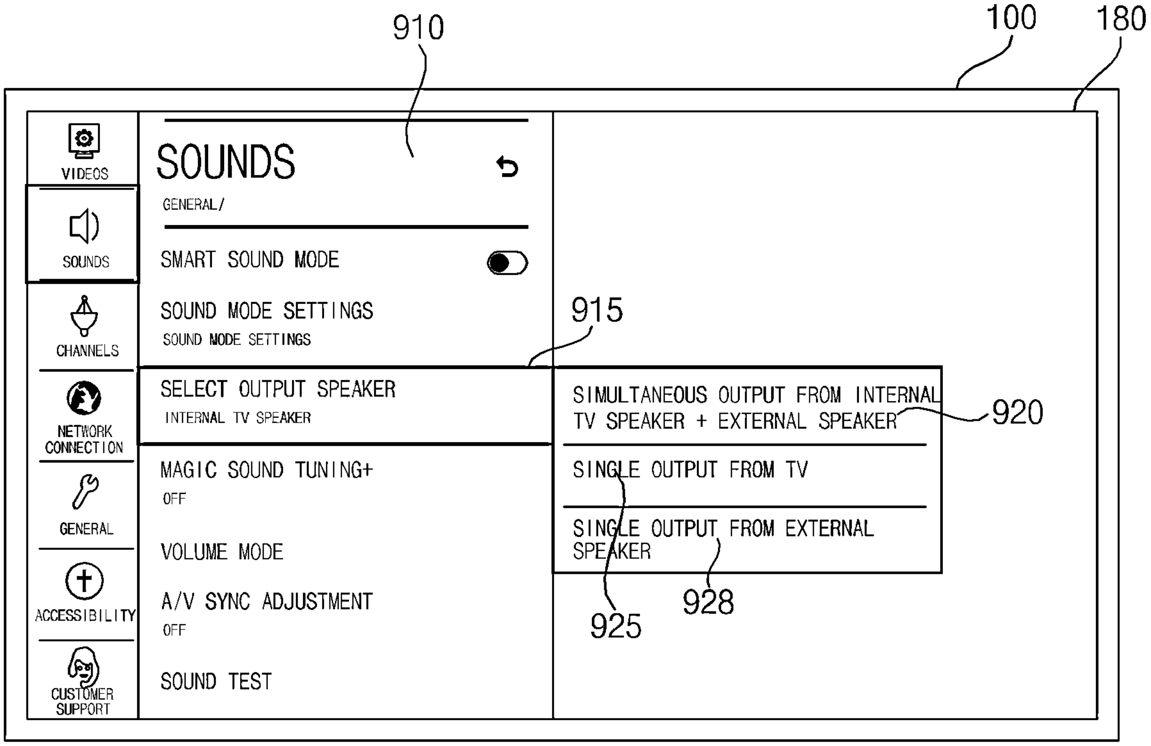

If the item 920 for simultaneous sound output is selected, the signal processing device 170 may control the simultaneous sound output mode to be performed as illustrated in FIG. 9C.

Meanwhile, if the wireless transmission item 921 is selected while the item 920 for simultaneous sound output is selected, the signal processing device 170 may control a simultaneous sound output mode based on wireless transmission to be performed.

To this end, the signal processing device 170 may output the first audio signal based on the first format to the audio output device 185, and may be configured to wirelessly transmit the second audio signal based on the first format to the external sound output device 400.

Meanwhile, if the number of times the external sound output device 400 requests retransmission is greater than or equal to the reference value, the signal processing device 170 may be configured to wirelessly transmit the audio signal based on the second format to the external sound output device 400.

Meanwhile, if the wired transmission item 922 is selected while the item 920 for simultaneous sound output is selected, the signal processing device 170 may control a simultaneous sound output mode based on wired transmission to be performed.

Meanwhile, if the item 925 for single sound output of the image display apparatus is selected, the signal processing device 170 may control a single sound output mode of the audio output device 185 to be performed.

Figure 9E:
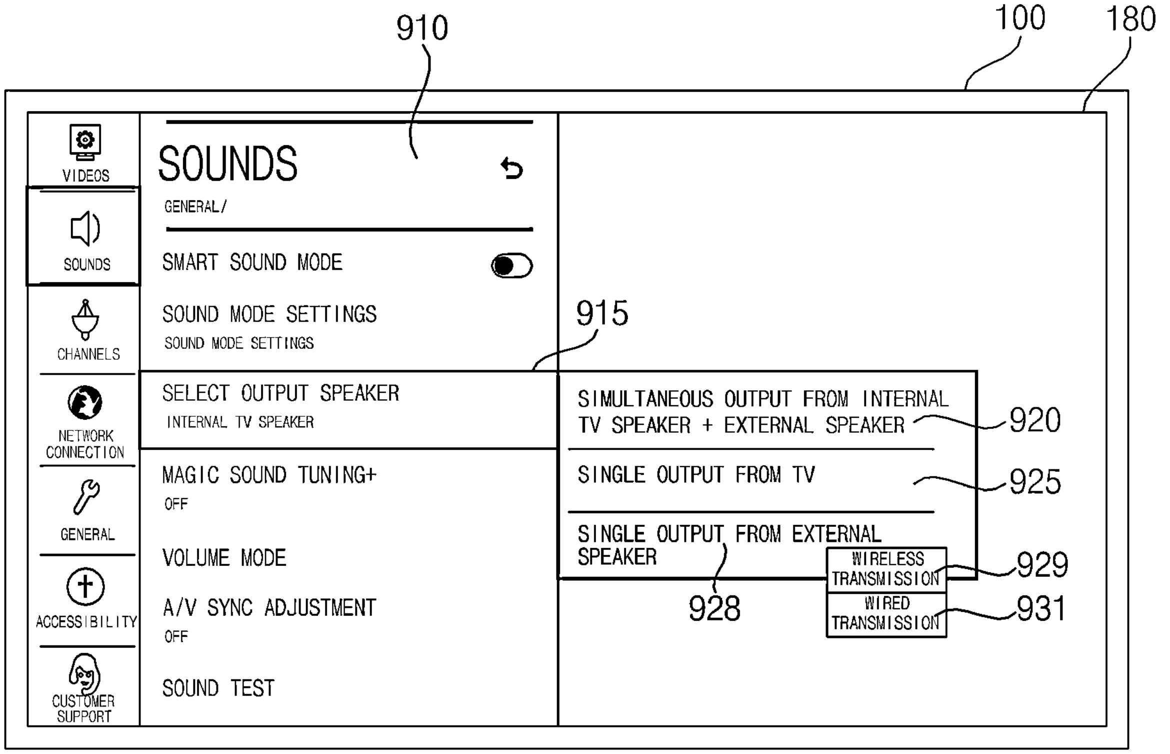

Meanwhile, if the item 928 for single sound output of the external sound output device is selected, the signal processing device 170 may control the wireless transmission item 929 and the wired transmission item 931 to be displayed as illustrated in FIG. 9E.

Meanwhile, if the wireless transmission item 929 is selected while the item 928 for single sound output of the external sound output device is selected, the signal processing device 170 may control the single sound output mode based on wireless transmission to be performed. To this end, the signal processing device 170 may be configured to wirelessly transmit an audio signal based on a predetermined format to the external sound output device 400.

Meanwhile, if the number of times the external sound output device 400 requests retransmission is greater than or equal to the reference value, the signal processing device 170 may be configured to change the format and wirelessly transmit an audio signal based on the changed format to the external sound output device 400.

Meanwhile, if the wired transmission item 931 is selected while the item 928 for single sound output of the external sound output device is selected, the signal processing device 170 may control a single sound output mode based on wired transmission to be performed.

Figure 10A:
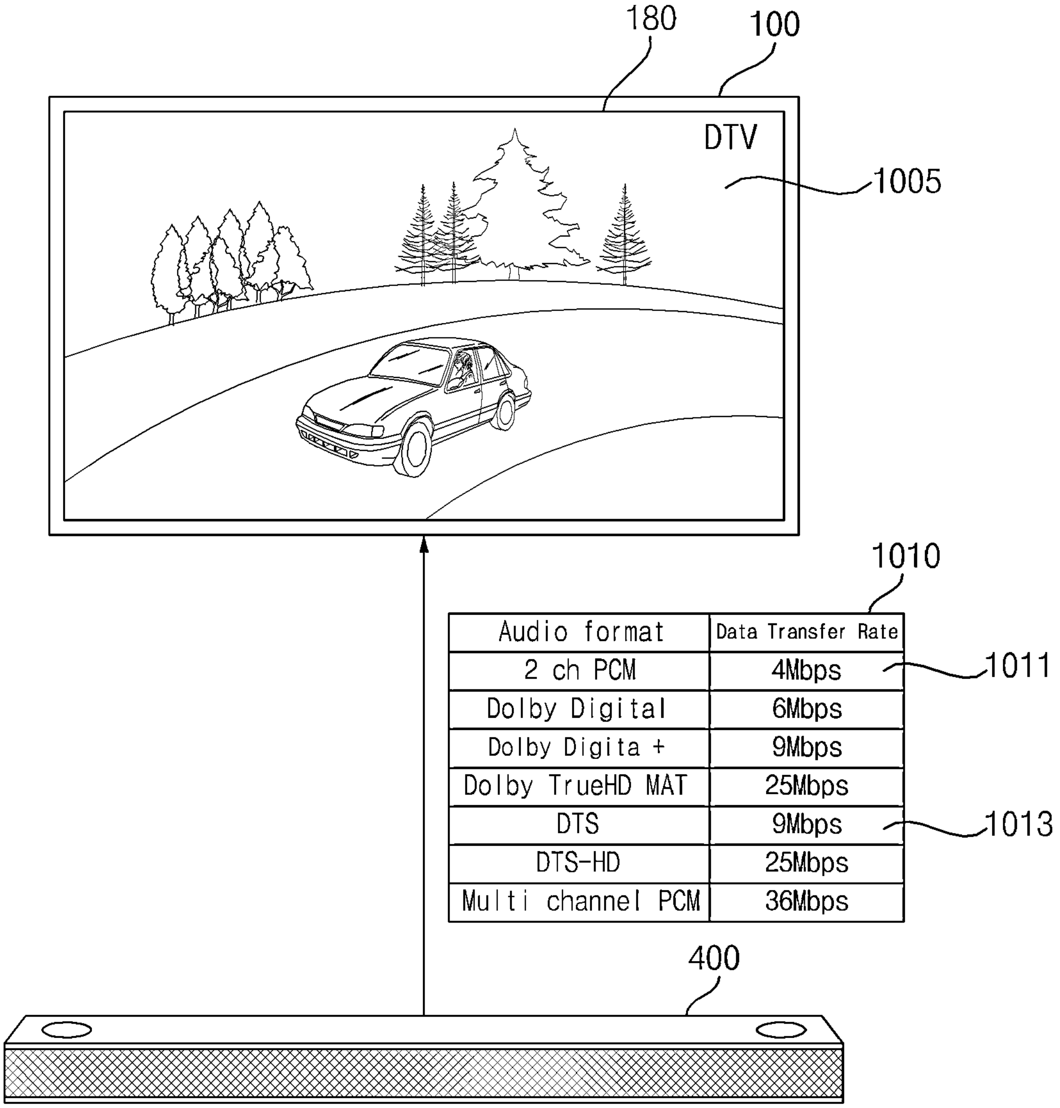

FIG. 10A is a diagram illustrating an example of receiving audio format information from the external sound output device 400.

Referring to FIG. 10A, after the external sound output device 400 is turned on, the signal processing device 170 of the image display apparatus 100 may receive audio format information 1010 which is processable by the external sound output device 400.

In the drawing, an example is illustrated in which as the external sound output device 400 is turned on while a broadcast video 1005 is displayed, the audio format information 1010 processable by the external sound output device 400 is received by wire.

Unlike the drawing, the audio format information 1010 processable by the external sound output device 400 may also be received wirelessly.

Meanwhile, in the drawing, an example is illustrated in which the audio format information 1010 processable by the external sound output device 400 includes a two-channel PCM format 1011, a Dolby Digital format, a Dolby Digital plus format, a Dolby TrueHD MAT format, a DTS format 1013, a DTS-HD format, and a multi-channel PCM format, and data transfer rates of the formats are 4 Mbps, 6 Mbps, 9 Mbps, 25 Mbps, 9 Mbps, 25 Mbps, and 36 Mbps, respectively, but may be modified variously.

Figure 10B:
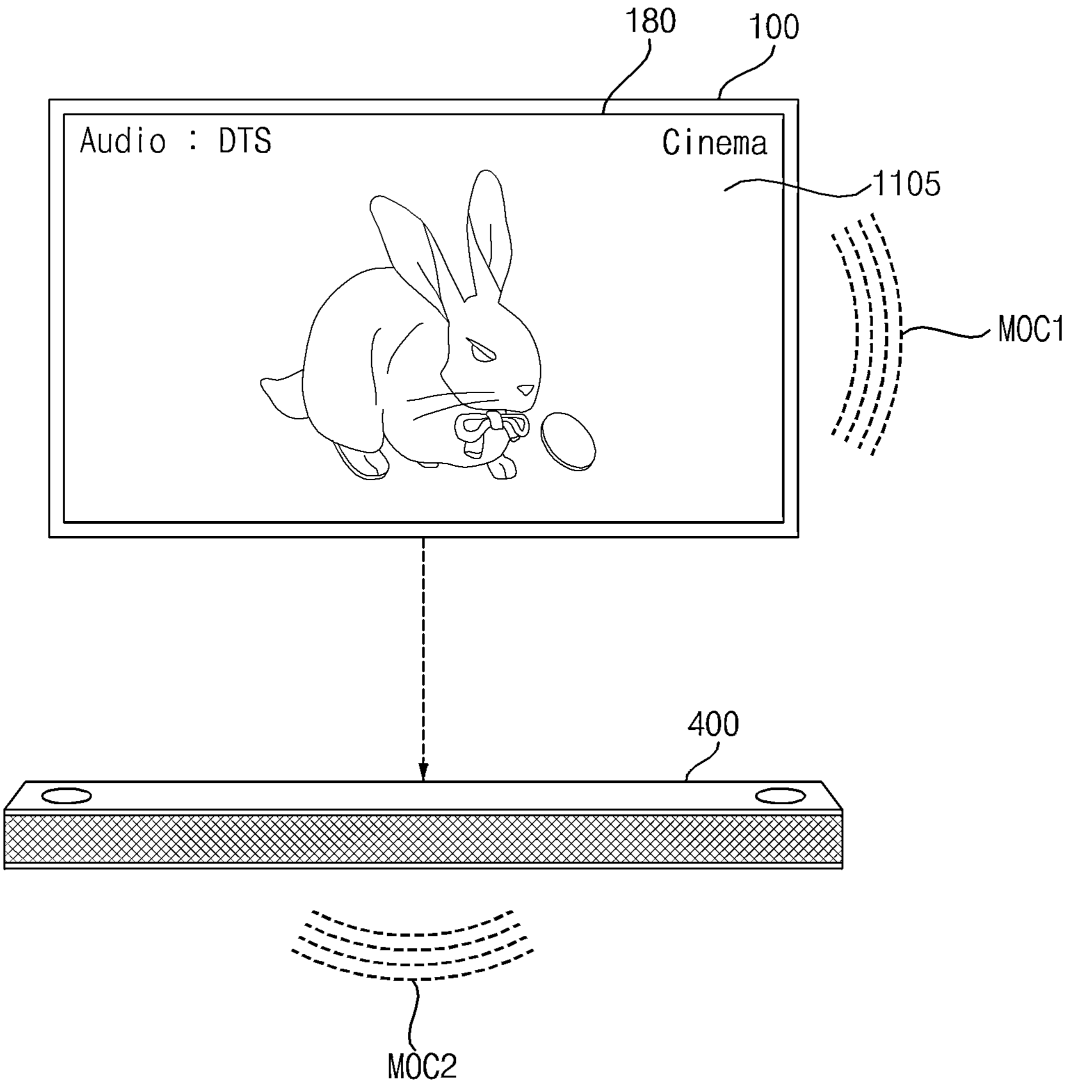

FIG. 10B is a diagram illustrating an example of a simultaneous sound output mode and a wireless transmission mode.

Referring to FIG. 10B, in the simultaneous sound output mode of the external sound output device 400 and the audio output device 185 and in the mode of wireless transmission to the external sound output device 400, the signal processing device 170 may output a first audio signal based on a first format and a second audio signal based on the first format.

Accordingly, the first audio signal based on the first format may be input to the audio output device 185, and the second audio signal based on the first format may be input to the wireless communication device 135*a*, such that the first and second audio signals may be transmitted through the wireless communication device 135*a* to the external sound output device 400 which is connected wirelessly.

As a result, while the video 1105 is displayed, the audio output device 185 in the image display apparatus 100 outputs sound MOC1 corresponding to the first audio signal based on the first format, and the external sound output device 400 outputs sound MOC2 corresponding to the second audio signal based on the first format received from the signal processing device 170, such that the sounds may be output simultaneously.

Accordingly, it is possible to stably output sound through the external sound output device 400 wirelessly connected to the image display apparatus. Particularly, the image display apparatus 100 and the external sound output device 400 connected wirelessly may simultaneously output sound.

Meanwhile, based on content displayed on the display 180, the signal processing device 170 may change a format of an audio signal transmitted wirelessly to the external sound output device 400.

As illustrated herein, if the content displayed on the display 190 is a cinema video 1105, the signal processing device 170 may output a first audio signal and a second audio signal corresponding to the first format which is the DTS format.

Figure 10C:
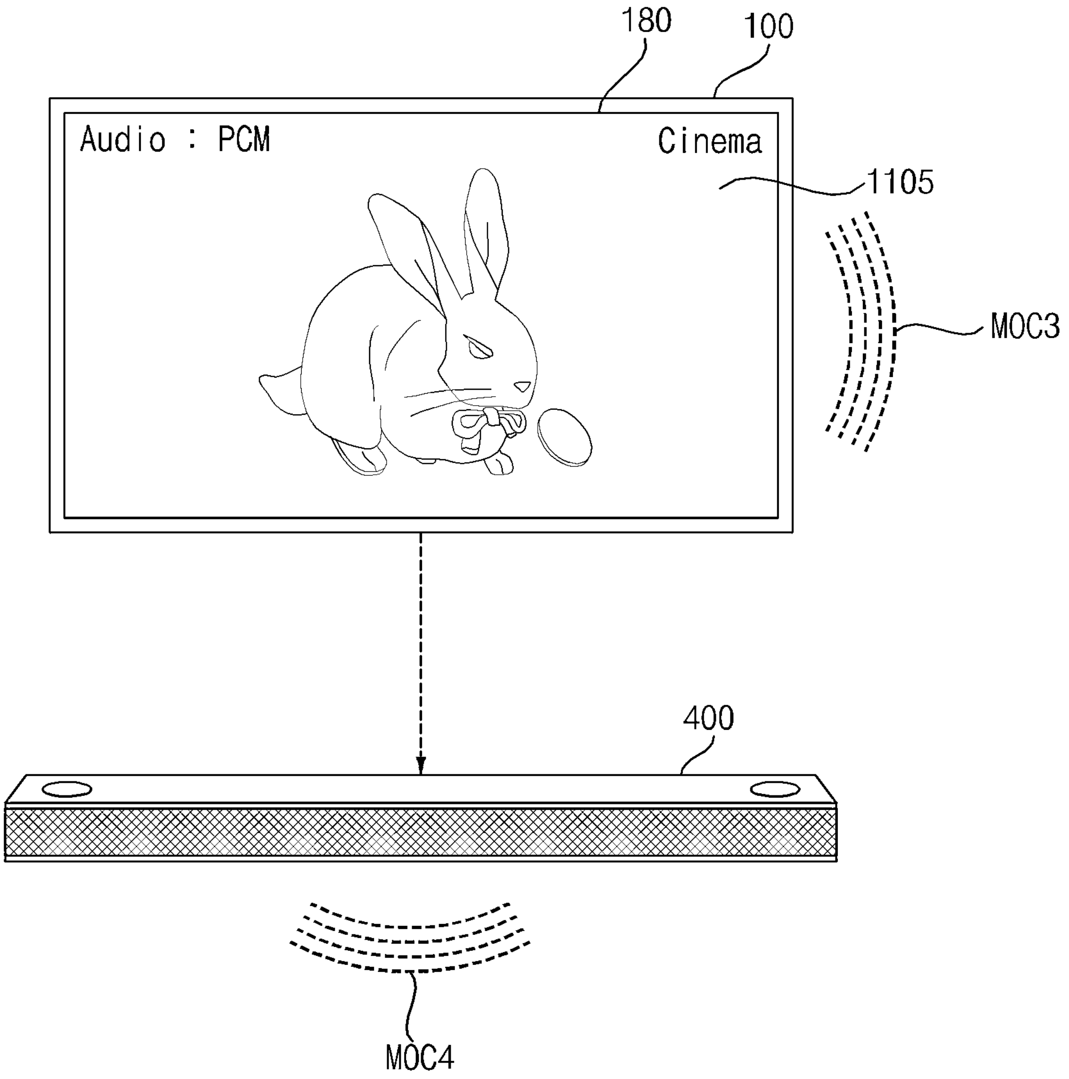

FIG. 10C is a diagram illustrating another example of a simultaneous sound output mode and a wireless transmission mode.

Referring to FIG. 10C, while transmitting a second audio signal based on a first format, if the number of times the external sound output device 400 requests retransmission is greater than or equal to a reference value, the signal processing device 170 may control an audio signal, which is based on a second format with a wireless data transfer rate less than the first format, to the external sound output device 400.

That is, if the number of times the external sound output device 400 requests retransmission is greater than or equal to the reference value while transmitting the second audio signal based on the first format, the signal processing device 170 may output a third audio signal based on the second format to the audio output device 185, and may be configured to wirelessly transmit a fourth audio signal based on the second format to the external sound output device 400.

For example, the first format may be a DTS format, and the second format may be a two-channel PCM format.

As a result, while the video 1105 is displayed, the audio output device 185 in the image display apparatus 100 outputs sound MOC3 corresponding to the third audio signal based on the second format, and the external sound output device 400 outputs sound MOC4 corresponding to the fourth audio signal based on the second format received from the signal processing device 170, such that the sounds may be output simultaneously.

Accordingly, it is possible to stably output sound through the external sound output device 400 wirelessly connected to the image display apparatus. Particularly, the image display apparatus 100 and the external sound output device 400 connected wirelessly may simultaneously output sound.

Meanwhile, unlike FIGS. 10B and 10C, if a video displayed on the image display apparatus 100 is a broadcast video, the first format may be a Dolby Digital format, rather than the DTS format.

That is, the signal processing device 170 may select an audio format with a higher data transfer rate or a wider bandwidth in the case where a cinema video is displayed on the image display device 100, compared to the case where the broadcast video is displayed on the image display device 100. Accordingly, sound appropriate for content may be stably output.

Figure 11A:
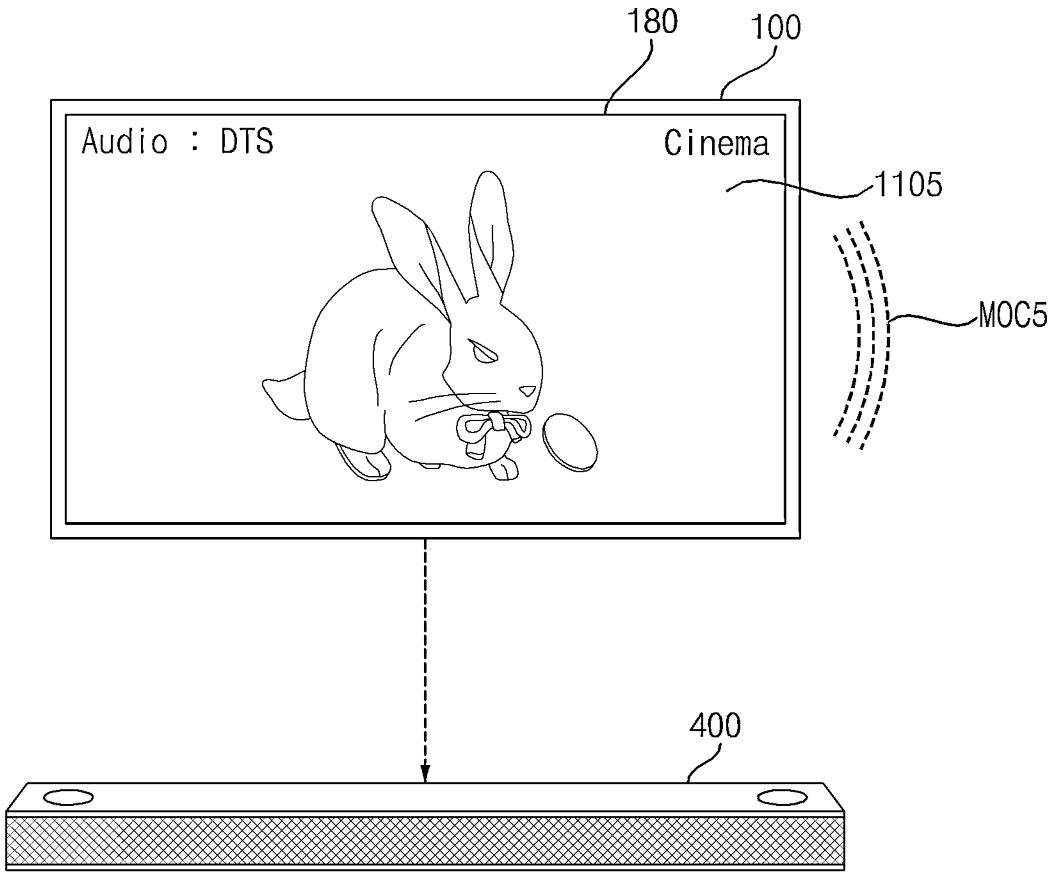

FIG. 11A is a diagram illustrating an example of a single sound output mode of an image display apparatus.

Referring to FIG. 11A, the signal processing device 170 may output a fifth audio signal in the single sound output mode of the image display apparatus while the video 1105 is displayed.

Accordingly, the audio output device 185 may output sound MOC5 corresponding to the fifth audio signal. Accordingly, only the image display apparatus 100 may output sound.

Figure 11B:
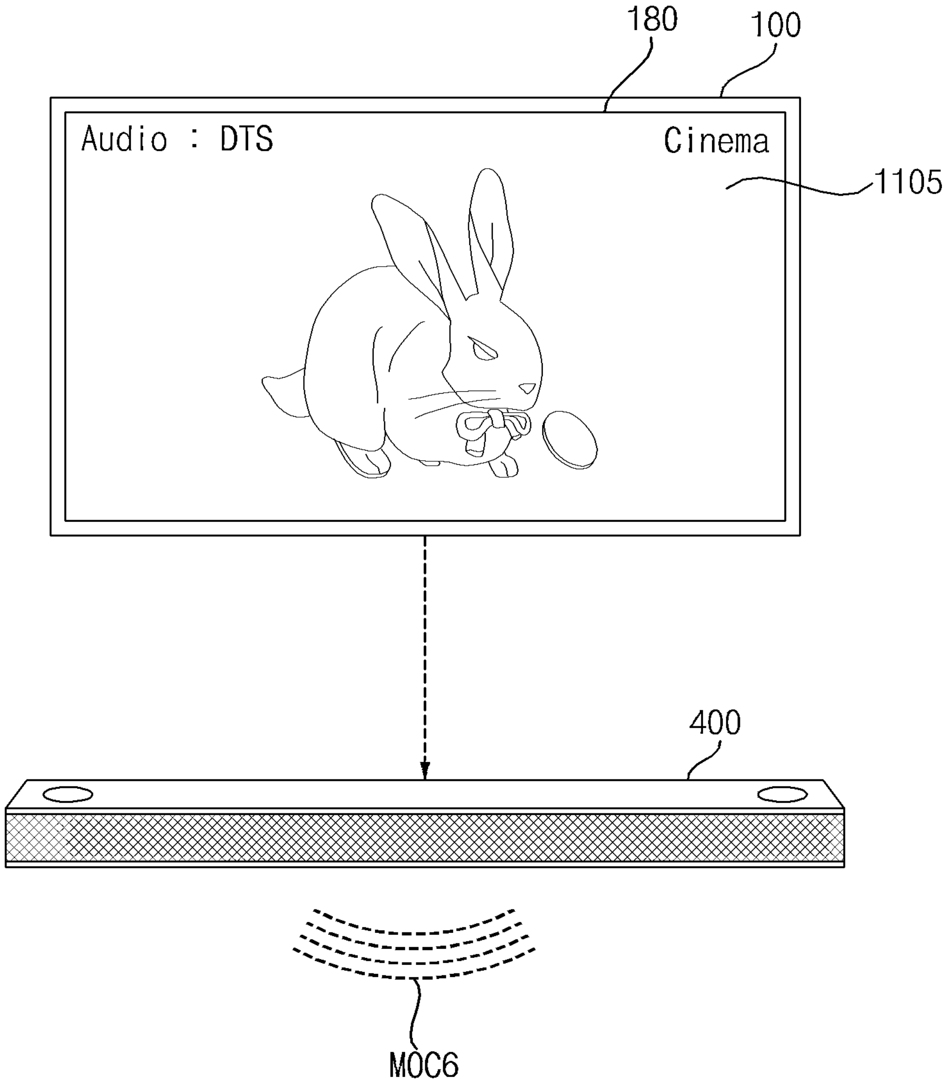

FIG. 11B is a diagram illustrating an example of a wireless transmission mode and a single sound output mode of the external sound output device 400.

Referring to FIG. 11B, in the single sound output mode of the external sound output device 400 and the mode of wireless transmission to the external sound output device 400, the signal processing device 170 may be configured to wirelessly transmit an audio signal based on a predetermined format to the external sound output device 400.

In response thereto, the external sound output device 400 may solely output sound MOC6 corresponding to the audio signal received wirelessly from the signal processing device 170.

Meanwhile, in the single sound output mode of the external sound output device 400 and the mode of wireless transmission to the external sound output device 400, the signal processing device 170 may control an audio signal, which is based on a third format greater than the first format, to the external sound output device 400. In this case, the first format may be a DTS format, and the third format may be a multi-channel PCM format.

Alternatively, in the single sound output mode of the external sound output device 400 and the mode of wireless transmission to the external sound output device 400, the signal processing device 170 may wirelessly transmit the audio signal based on the first format to the external sound output device 400.

Figure 11C:
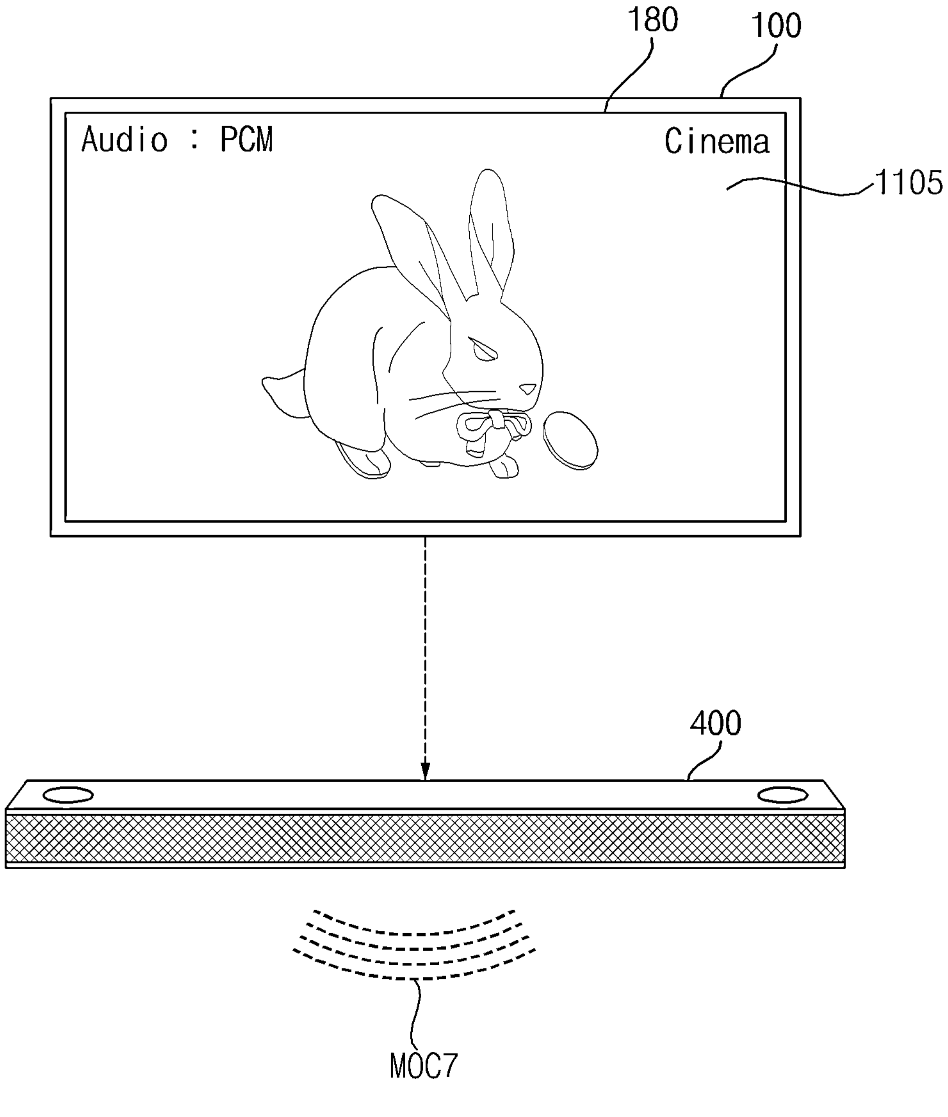

FIG. 11C is a diagram illustrating another example of a wireless transmission mode and a single sound output mode of the external sound output device 400.

Referring to FIG. 11C, in the single sound output mode of the external sound output device 400 and the mode of wireless transmission to the external sound output device 400, if the number of times the external sound output device 400 requests retransmission is greater than or equal to a reference value while transmitting the audio signal based on a predetermined format, the signal processing device 170 may output an audio signal, which is based on a format with a lower wireless data transfer rate, to the external sound output device 400.

For example, if the number of times the external sound output device 400 requests retransmission is greater than or equal to the reference value while transmitting an audio signal based on a third format, the signal processing device 170 may be configured to wirelessly transmit an audio signal based on a fourth format to the external sound output device 400 as illustrated in FIG. 11C.

For example, the third format may be a multi-channel PCM format, and the fourth format may be a Dolby Digital format or a two-channel PCM format.

As a result, while the video 1105 is displayed, the external sound output device 400 may solely output sound MOC7 corresponding to the audio signal based on the fourth format received from the signal processing device 170.

Accordingly, it is possible to stably output sound through the external sound output device 400 wirelessly connected to the image display apparatus. Particularly, the external sound output device 400 which is connected wirelessly may solely output sound.

FIGS. 12A to 13B are diagrams illustrating an example of outputting sound in a wired transmission mode.

Figure 12A:
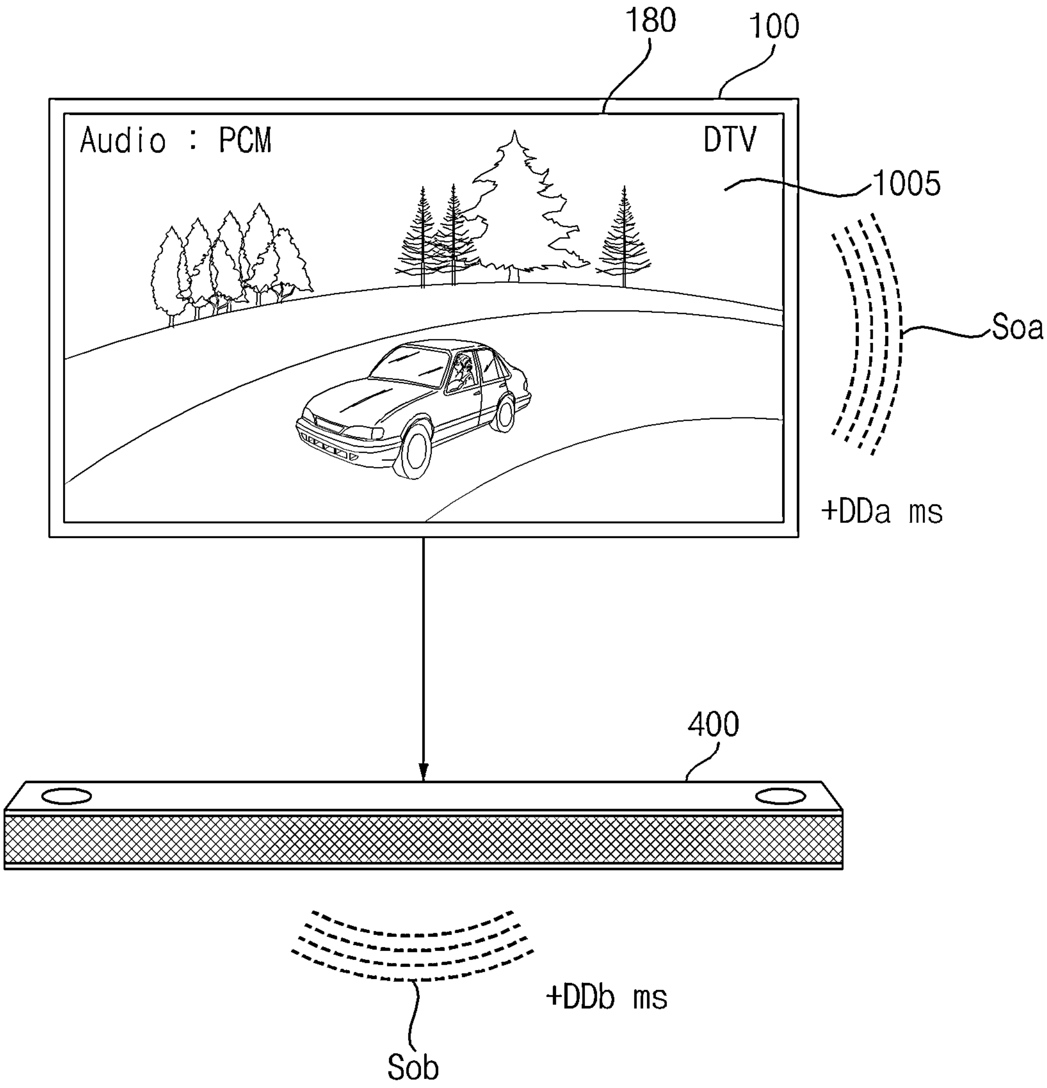

FIG. 12A is a diagram illustrating an example of a simultaneous sound output mode and a wired transmission mode.

Referring to FIG. 12A, in the simultaneous sound output mode and the wired transmission mode, while the broadcast video 1005 is displayed, the signal processing device 170 may calculate a first additional delay time DDa based on audio format information or audio processing time information of the external sound output device 400, and may output a first audio signal Stv based on the calculated first additional delay time DDa.

Accordingly, the audio output device 185 in the image display apparatus 100 outputs a first sound Soa corresponding to the first audio signal based on the first additional delay time DDa.

Meanwhile, while the broadcast video 1005 is displayed, the signal processing device 170 may calculate a second additional delay time DDb based on the audio format information or audio processing time information of the external sound output device 400, and may output a second audio signal Sau based on the calculated second additional delay time DDb.

Meanwhile, the external sound output device 400 outputs a second sound Sob based on the second audio signal Sau received from the signal processing device 170.

For example, in the simultaneous sound output mode, if a video processing time of the input video signal in the video driver 609 is 100 ms, an audio processing time of a PCM audio signal in the audio driver 607 is 10 m, an audio processing time of the PCM audio signal in the external sound output device 400 is 70 ms, and a time of output processing to the external sound output device 400 is 20 m, the video processing time has a greatest delay, such that a total delay may be set to 100 ms, the first additional delay time may be set to 90 ms which is 100 ms−10 ms, and the second additional delay time may be set to 10 ms which is 100 ms−(70 ms+20 ms).

That is, the second additional delay time may be less than the first additional delay time. Accordingly, sound synchronized with the video signal may be output from the audio output device 185 and the external sound output device 400.

Figure 12B:
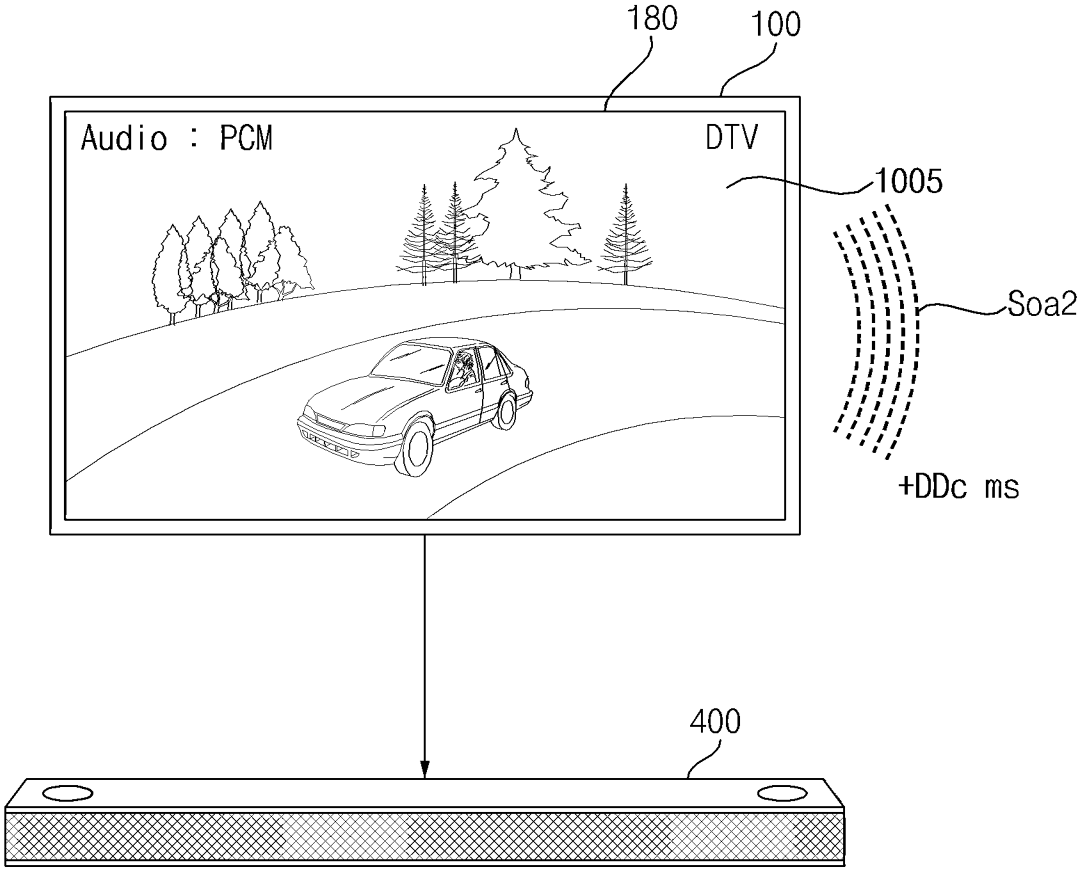

FIG. 12B is a diagram illustrating an example of a single sound output mode of an image display apparatus.

Referring to FIG. 12B, in the single sound output mode of the image display apparatus while the broadcast video 1005 is displayed, the signal processing device 170 may calculate a third additional delay time DDc of a fifth audio signal based on a video processing time of an input video signal while ignoring audio format information or audio processing time information of the external sound output device 400, and may output a fifth audio signal Stt based on the calculated third additional delay time DDc.

Accordingly, the audio output device 185 of the image display device 100 outputs a third sound Soa2 corresponding to the fifth audio signal Stt.

Meanwhile, the external sound output device 400 does not output sound.

For example, if the video processing time of the input video signal in the video driver 609 is 100 ms, and the audio processing time of the PCM audio signal in the audio driver 607 is 10 m, the signal processing device 170 may calculate 90 ms, which is a difference between the times, as the third additional delay time DDc.

Meanwhile, while the broadcast video 1005 is displayed on the display 180, the signal processing device 170 may control the additional delay time DDa of the first sound Soa, which is based on the first audio signal Stv output from the audio output device 185, to be greater than or equal to the third additional delay time DDc of the third sound Soa2 based on the fifth audio signal Stt output from the audio output device 185.

In comparison of FIGS. 12A and 12B, the first additional delay time DDa of FIG. 12A, which is 90 ms, may be equal to the third additional delay time DDc of FIG. 12B which is 90 ms.

Figure 12C:
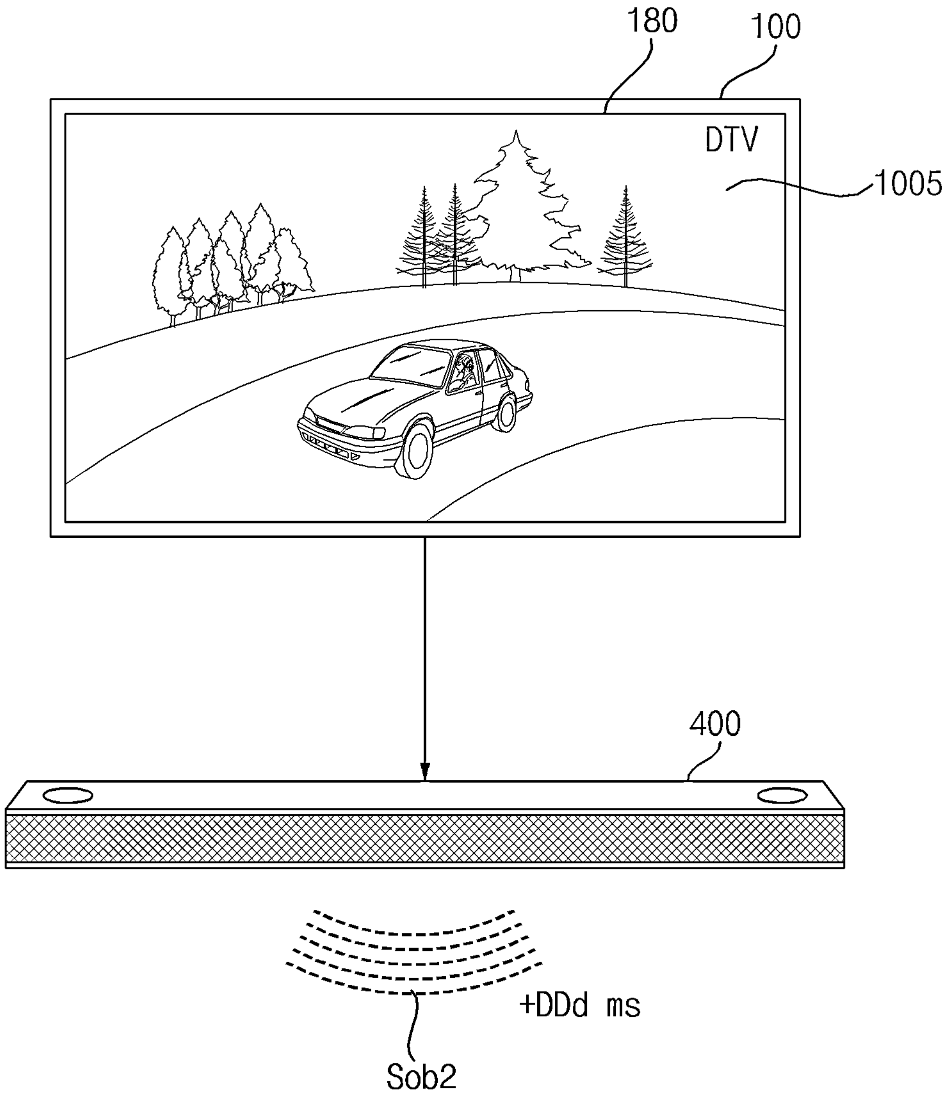

FIG. 12C is a diagram illustrating an example of a single sound output mode of an external sound output device and a wired transmission mode.

Referring to FIG. 12C, in the single sound output mode of the external sound output device 400 while the broadcast video 1005 is displayed, the signal processing device 170 may output an audio signal to the external sound output device 400 without outputting the audio signal to the audio output device 185.

Accordingly, the audio output device 185 in the image display apparatus 100 does not output sound, and the external sound output device 400 may output a fourth sound Sob2 which is the only sound output.

In the single sound output mode of the external sound output device 400, the signal processing device 170 may calculate a fourth additional delay time DDd based on a video processing time of an input video signal in the video driver 609, an audio processing time in the external sound output device 400, and a time of output processing to the external sound output device 400, and may output the fourth audio signal based on the fourth additional delay time DDd to the external sound output device 400.

Meanwhile, the fourth additional delay time DDd may be equal to the second additional delay time DDb.

Figure 13A:
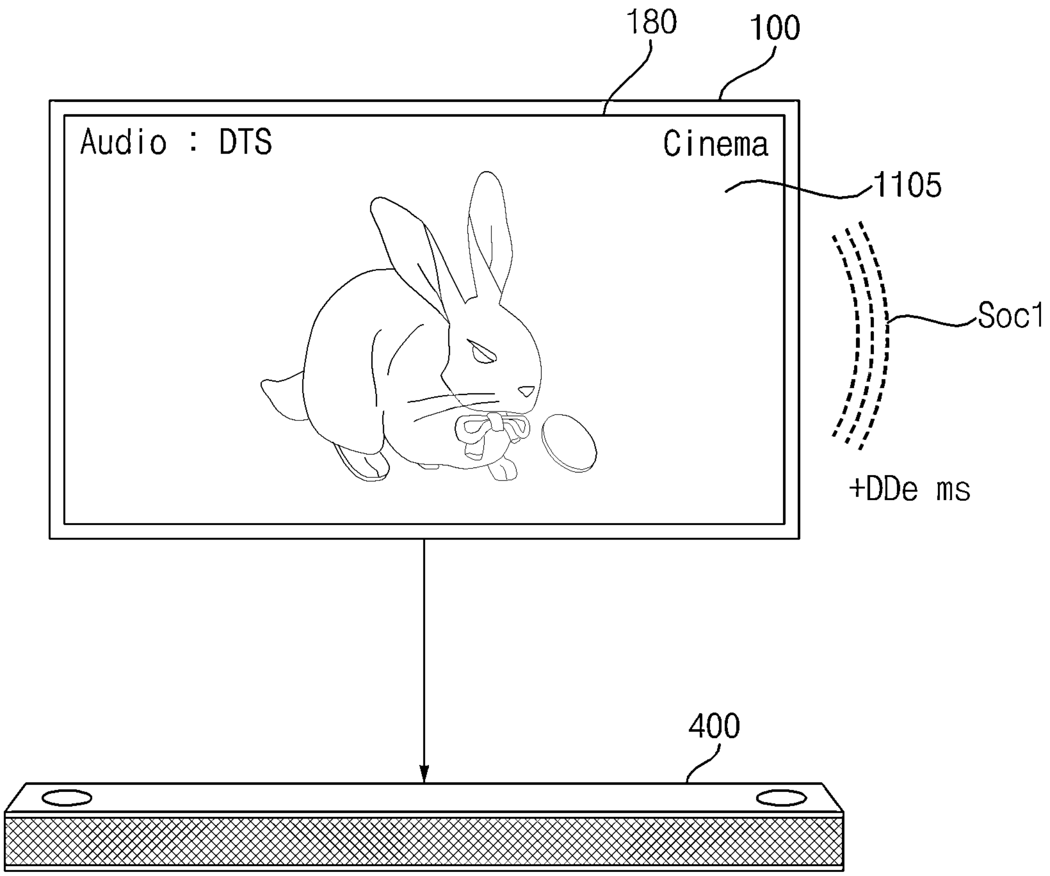

FIG. 13A is a diagram illustrating another example of a single sound output mode of an image display apparatus.

Referring to FIG. 13A, in the single sound output mode of the image display apparatus while the cinema video 1105 is displayed, the signal processing device 170 may calculate a third additional delay time DDe based on video processing time information of an input video signal and audio processing time information for the audio output device 185, while ignoring audio format information or audio processing time information of the external sound output device 400, and may output a fifth audio signal Stt based on the calculated third additional delay time DDe.

For example, if the video processing time of the input video signal in the video driver 609 is 100 ms, and the audio processing time of the DTS audio signal in the audio driver 607 is 20 m, the signal processing device 170 may calculate 80 ms, which is a difference between the times, as the third additional delay time DDe.

Accordingly, the audio output device 185 in the image display apparatus 100 outputs a third sound Soc1 corresponding to the fifth audio signal Stt based on the third additional delay time DDe. Meanwhile, the external sound output device 400 does not output sound.

Figure 13B:
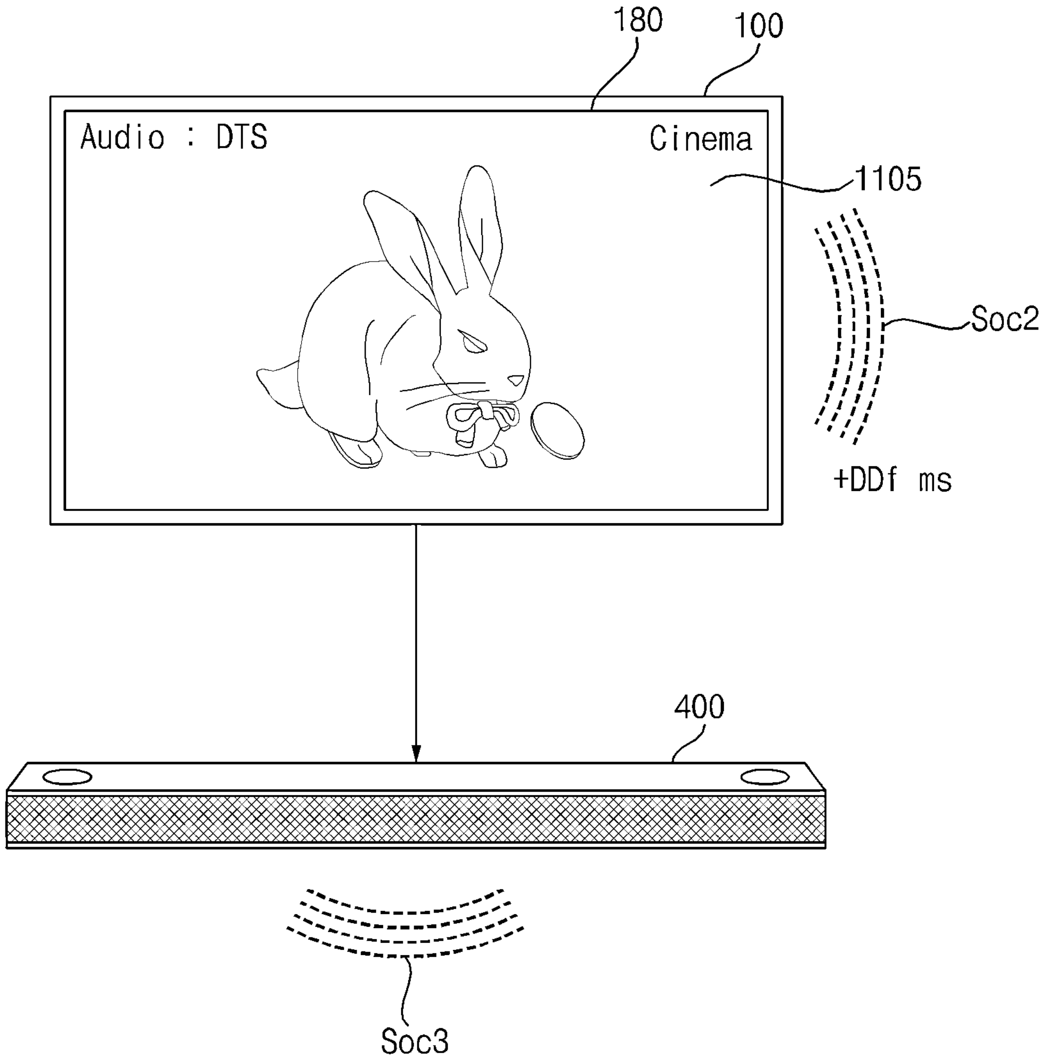

FIG. 13B is a diagram illustrating another example of a simultaneous sound output mode and a wired transmission mode.

Referring to FIG. 13B, in the simultaneous sound output mode, the signal processing device 170 may calculate a first additional delay time DDf of a first audio signal Stv and a second additional delay time DDg of a second audio signal Sau based on a video processing time of an input video signal in the video driver 609, audio processing time information according to audio format information of the external sound output device 400, an audio processing time in the audio driver 607, and a time of output processing to the external sound output device 400.

Accordingly, the audio output device 185 in the image display apparatus 100 may output a first sound Soc2 corresponding to the first audio signal.

Meanwhile, the external sound output device 400 outputs a second sound Soc3 based on a second audio signal Sau from the signal processing device 170.

For example, in the simultaneous sound output mode, if a video processing time of the input video signal in the video driver 609 is 100 ms, an audio processing time of a DTS audio signal in the audio driver 607 is 20 m, an audio processing time of the DTS audio signal in the external sound output device 400 is 120 ms, and a time of output processing to the external sound output device 400 is 20 m, the sum of delays of the external sound output device 400, not the video processing time, has a greatest delay such that a total delay may be set to 120 ms+20 ms=140 ms, the additional delay time of the video may be set to 40 ms which is 140 ms−100 ms, the first additional delay time may be set to 130 ms which is 140 ms−10 ms, and the second additional delay time may be set to 0 ms by considering the delay time of 140 ms. Accordingly, sound synchronized with the video signal may be output from the audio output device 185 and the external sound output device 400.

That is, as illustrated in the drawing, the output time of the first sound Soc2 coincides with the delay time of the second sound Soc3. Accordingly, when the image display apparatus 100 and the external sound output device 400 simultaneously output sound, surround sound may be output.

Meanwhile, in comparison of FIGS. 12A and 13B, the signal processing device 170 may control the additional delay time DDf of the first sound Soc2 based on the first audio signal, which is output from the audio output device 185 while the cinema video 1105 is displayed on the display 180, to be greater than the additional delay time DDa of the first sound based on the first audio signal, which is output from the audio output device 185 while the broadcast video 1005 is displayed on the display 180.

As described above, the additional delay time DDf of the first sound Soc2 of FIG. 13B may be 130 ms which is 140 ms−10 ms, and the additional delay time DDa of the first sound Soa of FIG. 12A may be 90 ms.

As described above, an image display apparatus according to an embodiment of the present disclosure comprises: a display; an audio output device configured to output sound; an interface configured to exchange data with an external sound output device in a wired manner; a wireless communication device configured to exchange data with the external sound output device in a wireless manner; and a signal processing device configured to, in a simultaneous sound output mode of the external sound output device and the audio output device and in a mode of wireless transmission to the external sound output device, output a first audio signal to the audio output device, and wirelessly transmit a second audio signal based on a first format to the external sound output device, and, in response to a number of retransmission requests from the external sound output device being greater than or equal to a reference value, wirelessly transmit an audio signal based on a second format to the external sound output device. Accordingly, it is possible to stably output sound through the external sound output device wirelessly connected to the image display apparatus. Particularly, the image display apparatus and the external sound output device connected wirelessly may simultaneously output sound.

Meanwhile, in response to the number of retransmission requests from the external sound output device being greater than or equal to the reference value, the signal processing device may be configured to wirelessly transmit an audio signal, which is based on the second format with a wireless data transfer rate less than the first format, to the external sound output device. Accordingly, it is possible to stably output sound through the external sound output device wirelessly connected to the image display apparatus.

Meanwhile, when outputting the audio signal based on the second format, the signal processing device may be configured to output an audio signal based on the first format to the audio output device. Accordingly, it is possible to stably output sound through the external sound output device wirelessly connected to the image display apparatus.

Meanwhile, when outputting the audio signal based on the second format, the signal processing device may be configured to output an audio signal based on the second format to the audio output device. Accordingly, it is possible to stably output sound through the external sound output device wirelessly connected to the image display apparatus.

Meanwhile, in the simultaneous sound output mode of the external sound output device and the audio output device and in the mode of wireless transmission to the external sound output device, the signal processing device may be configured to output a first audio signal based on the first format to the audio output device, and wirelessly transmit a second audio signal based on the first format to the external sound output device, wherein in response to the number of retransmission requests from the external sound output device being greater than or equal to the reference value, the signal processing device may be configured to output a third audio signal based on the second format to the audio output device, and wirelessly transmit a fourth audio signal based on the second format to the external sound output device. Accordingly, it is possible to stably output sound through the external sound output device wirelessly connected to the image display apparatus. Particularly, the image display apparatus and the external sound output device connected wirelessly may simultaneously output sound.

Meanwhile, in a single sound output mode of the image display apparatus, the signal processing device may be configured to output a fifth audio signal, and the audio output device may be configured to output sound corresponding to the fifth audio signal. Accordingly, only the image display apparatus may output sound.

Meanwhile, in a single sound output mode of the external sound output device and in the mode of wireless transmission to the external sound output device, the signal processing device may be configured to wirelessly transmit an audio signal, which is based on a third format with a wireless data transfer rate greater than the first format, to the external sound output device. Accordingly, it is possible to stably output sound through the external sound output device wirelessly connected to the image display apparatus.

Meanwhile, in the single sound output mode of the external sound output device and in the mode of wireless transmission to the external sound output device, the signal processing device may be configured to wirelessly transmit the audio signal based on the first format to the external sound output device. Accordingly, it is possible to stably output sound through the external sound output device wirelessly connected to the image display apparatus.

Meanwhile, in the single sound output mode of the external sound output device and in the mode of wireless transmission to the external sound output device, the signal processing device may be configured to wirelessly transmit the audio signal based on the third format to the external sound output device, wherein in response to the number of retransmission requests from the external sound output device being greater than or equal to the reference value or a second reference value, the signal processing device may be configured to wirelessly transmit an audio signal based on a fourth format to the external sound output device. Accordingly, it is possible to stably output sound through the external sound output device wirelessly connected to the image display apparatus.

Meanwhile, after transmitting the audio signal based on the fourth format, in response to the number of retransmission requests from the external sound output device being greater than or equal to the reference value or an allowable value, the signal processing device may be configured to switch the mode of wireless transmission to the external sound output device to a wired transmission mode, and transmit the audio signal by wire to the external sound output device. Accordingly, it is possible to stably output sound through the external sound output device wirelessly connected to the image display apparatus.

Meanwhile, in the mode of wireless transmission to the external sound output device, the signal processing device may be configured to wirelessly transmit an audio signal, which is based on an audio format processable by the external sound output device, to the external sound output device. Accordingly, it is possible to stably output sound through the external sound output device wirelessly connected to the image display apparatus.

Meanwhile, the signal processing device may be configured to receive, from the external sound output device, audio format information processable by the external sound output device, and may be configured to wirelessly transmit an audio signal based on an audio format, which is selected from the received audio format information based on an environment of wireless connection with the external sound output device, to the external sound output device. Accordingly, it is possible to stably output sound through the external sound output device wirelessly connected to the image display apparatus.

Meanwhile, the interface may be configured to receive, from the external sound output device, the audio format information processable by the external sound output device, and to transmit the received audio format information to the signal processing device. Accordingly, it is possible to stably output sound through the external sound output device wirelessly connected to the image display apparatus.

Meanwhile, after transmitting the audio signal based on the second format, in response to the number of retransmission requests from the external sound output device being greater than or equal to the reference value or an allowable value, the signal processing device may be configured to switch the mode of wireless transmission to the external sound output device to a wired transmission mode, and transmit the audio signal by wire to the external sound output device. Accordingly, the signal may be transmitted by wire or wirelessly to the external sound output device. Further, the external sound output device may stably output sound.

Meanwhile, the signal processing device may be configured to control a first delay added to the first audio signal, in the simultaneous sound output mode of the external sound output device and the audio output device and in the mode of wireless transmission to the external sound output device, to be greater than a second delay added to the first audio signal, in the simultaneous sound output mode of the external sound output device and the audio output device and in the wired transmission mode of wired transmission to the external sound output device. Accordingly, it is possible to stably output sound through the external sound output device wirelessly connected to the image display apparatus.

Meanwhile, based on content displayed on the display, the signal processing device may be configured to change a format of an audio signal transmitted wirelessly to the external sound output device. Accordingly, it is possible to stably output sound through the external sound output device wirelessly connected to the image display apparatus.

An image display apparatus according to another embodiment of the present disclosure comprises: a display; an audio output device configured to output sound; an interface configured to exchange data with an external sound output device in a wired manner; a wireless communication device configured to exchange data with the external sound output device in a wireless manner; and a signal processing device configured to, in a mode of wireless transmission to the external sound output device, wirelessly transmit an audio signal based on a first format to the external sound output device, and, in response to a number of retransmission requests from the external sound output device being greater than or equal to a reference value, wirelessly transmit an audio signal based on a second format to the external sound output device, and after transmitting the audio signal based on the second format, in response to the number of retransmission requests from the external sound output device being greater than or equal to the reference value or an allowable value, switch the mode of wireless transmission to the external sound output device to a wired transmission mode, and transmit the audio signal by wire to the external sound output device. Accordingly, the signal may be transmitted by wire or wirelessly to the external sound output device. Further, the external sound output device may stably output sound.

Meanwhile, the interface may be configured to receive, from the external sound output device, audio format information processable by the external sound output device, and to transmit the received audio format information to the signal processing device, wherein the signal processing device is configured to wirelessly transmit an audio signal based on an audio format, which is selected from the received audio format information based on an environment of wireless connection with the external sound output device, to the external sound output device. Accordingly, it is possible to stably output sound through the external sound output device wirelessly connected to the image display apparatus.

Meanwhile, the signal processing device may be configured to control a first delay added to an audio signal transmitted to the audio output device, in a simultaneous sound output mode of the external sound output device and the audio output device and in the mode of wireless transmission to the external sound output device, to be greater than a second delay added to the audio signal transmitted to the audio output device, in the simultaneous sound output mode of the external sound output device and the audio output device and in the wired transmission mode of wired transmission to the external sound output device. Accordingly, it is possible to stably output sound through the external sound output device wirelessly connected to the image display apparatus.

Meanwhile, based on content displayed on the display, the signal processing device is configured to change a format of an audio signal transmitted wirelessly to the external sound output device. Accordingly, it is possible to stably output sound through the external sound output device wirelessly connected to the image display apparatus.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display apparatus comprising:

a display;

an audio output device configured to output sound;

an interface configured to exchange data with an external sound output device in a wired manner;

a wireless communication device configured to exchange data with the external sound output device in a wireless manner; and a signal processing device configured to:

in a simultaneous sound output mode of the external sound output device and the audio output device and in a mode of wireless transmission to the external sound output device, output a first audio signal to the audio output device, and wirelessly transmit a second audio signal based on a first format to the external sound output device, receive, through the wireless communication device, retransmission request from the external sound output device, and in response to a number of the retransmission requests from the external sound output device being greater than or equal to a reference value, wirelessly transmit an audio signal based on a second format to the external sound output device, and display a first image on the display, wherein in response to the number of retransmission requests from the external sound output device being greater than or equal to the reference value, the signal processing device is configured to wirelessly transmit an audio signal, which is based on the second format with a wireless data transfer rate less than the first format, to the external sound output device.

2. The image display apparatus of claim 1, wherein the signal processing device is configured to output an audio signal based on the first format to the audio output device while outputting the audio signal based on the second format.

3. The image display apparatus of claim 1, wherein in the simultaneous sound output mode of the external sound output device and the audio output device and in the mode of wireless transmission to the external sound output device, the signal processing device is configured to output a first audio signal based on the first format to the audio output device, and wirelessly transmit a second audio signal based on the first format to the external sound output device, wherein in response to the number of retransmission requests from the external sound output device being greater than or equal to the reference value, the signal processing device is configured to output a third audio signal based on the second format to the audio output device, and wirelessly transmit a fourth audio signal based on the second format to the external sound output device.

4. The image display apparatus of claim 1, wherein in a single sound output mode of the image display apparatus, the signal processing device is configured to output a fifth audio signal, and the audio output device is configured to output sound corresponding to the fifth audio signal.

5. The image display apparatus of claim 1, wherein in a single sound output mode of the external sound output device and in the mode of wireless transmission to the external sound output device, the signal processing device is configured to wirelessly transmit an audio signal, which is based on a third format with a wireless data transfer rate greater than the first format, to the external sound output device.

6. The image display apparatus of claim 1, wherein in the single sound output mode of the external sound output device and in the mode of wireless transmission to the external sound output device, the signal processing device is configured to wirelessly transmit the audio signal based on the first format to the external sound output device.

7. The image display apparatus of claim 1, wherein in the single sound output mode of the external sound output device and in the mode of wireless transmission to the external sound output device, the signal processing device is configured to wirelessly transmit the audio signal based on a third format to the external sound output device, wherein in response to the number of retransmission requests from the external sound output device being greater than or equal to the reference value or a second reference value, the signal processing device is configured to wirelessly transmit an audio signal based on a fourth format to the external sound output device.

8. The image display apparatus of claim 7, wherein after transmitting the audio signal based on the fourth format, in response to the number of retransmission requests from the external sound output device being greater than or equal to the reference value or an allowable value, the signal processing device is configured to switch the mode of wireless transmission to the external sound output device to a wired transmission mode, and transmit the audio signal by wire to the external sound output device.

9. The image display apparatus of claim 1, wherein in the mode of wireless transmission to the external sound output device, the signal processing device is configured to wirelessly transmit an audio signal, which is based on an audio format processable by the external sound output device, to the external sound output device.

10. The image display apparatus of claim 1, wherein the signal processing device is configured to:

receive, from the external sound output device, audio format information processable by the external sound output device, and wirelessly transmit an audio signal based on an audio format, which is selected from the received audio format information based on an environment of wireless connection with the external sound output device, to the external sound output device.

11. The image display apparatus of claim 10, wherein the interface is configured to receive, from the external sound output device, the audio format information processable by the external sound output device, and to transmit the received audio format information to the signal processing device.

12. The image display apparatus of claim 1, wherein after transmitting the audio signal based on the second format, in response to the number of retransmission requests from the external sound output device being greater than or equal to the reference value or an allowable value, the signal processing device is configured to switch the mode of wireless transmission to the external sound output device to a wired transmission mode, and transmit the audio signal by wire to the external sound output device.

13. The image display apparatus of claim 12, wherein the signal processing device is configured to control a first delay added to the first audio signal, in the simultaneous sound output mode of the external sound output device and the audio output device and in the mode of wireless transmission to the external sound output device, to be greater than a second delay added to the first audio signal, in the simultaneous sound output mode of the external sound output device and the audio output device and in the wired transmission mode of wired transmission to the external sound output device.

14. The image display apparatus of claim 1, wherein based on content displayed on the display, the signal processing device is configured to change a format of an audio signal transmitted wirelessly to the external sound output device.

15. An image display apparatus comprising:

a display;

an audio output device configured to output sound;

an interface configured to exchange data with an external sound output device in a wired manner;

a wireless communication device configured to exchange data with the external sound output device in a wireless manner; and a signal processing device configured to:

in a mode of wireless transmission to the external sound output device, wirelessly transmit an audio signal based on a first format to the external sound output device, receive, through the wireless communication device, retransmission request from the external sound output device, in response to a number of retransmission requests from the external sound output device being greater than or equal to a reference value, wirelessly transmit an audio signal based on a second format to the external sound output device, and display a first image on the display, and after transmitting the audio signal based on the second format, in response to the number of retransmission requests from the external sound output device being greater than or equal to the reference value or an allowable value, switch the mode of wireless transmission to the external sound output device to a wired transmission mode, and transmit the audio signal by wire to the external sound output device, wherein in response to the number of retransmission requests from the external sound output device being greater than or equal to the reference value, the signal processing device is configured to wirelessly transmit an audio signal, which is based on the second format with a wireless data transfer rate less than the first format, to the external sound output device.

16. The image display apparatus of claim 15, wherein the interface is configured to receive, from the external sound output device, audio format information processable by the external sound output device, and to transmit the received audio format information to the signal processing device, wherein the signal processing device is configured to wirelessly transmit an audio signal based on an audio format, which is selected from the received audio format information based on an environment of wireless connection with the external sound output device, to the external sound output device.

17. The image display apparatus of claim 15, wherein based on content displayed on the display, the signal processing device is configured to change a format of an audio signal transmitted wirelessly to the external sound output device.

18. An image display apparatus comprising:

a display;

an audio output device configured to output sound;

an interface configured to exchange data with an external sound output device in a wired manner;

a wireless communication device configured to exchange data with the external sound output device in a wireless manner; and a signal processing device configured to:

in a mode of wireless transmission to the external sound output device, wirelessly transmit an audio signal based on a first format to the external sound output device, in response to a number of retransmission requests from the external sound output device being greater than or equal to a reference value, wirelessly transmit an audio signal based on a second format to the external sound output device, and after transmitting the audio signal based on the second format, in response to the number of retransmission requests from the external sound output device being greater than or equal to the reference value or an allowable value, switch the mode of wireless transmission to the external sound output device to a wired transmission mode, and transmit the audio signal by wire to the external sound output device wherein the signal processing device is configured to control a first delay added to an audio signal transmitted to the audio output device, in a simultaneous sound output mode of the external sound output device and the audio output device and in the mode of wireless transmission to the external sound output device, to be greater than a second delay added to the audio signal transmitted to the audio output device, in the simultaneous sound output mode of the external sound output device and the audio output device and in the wired transmission mode of wired transmission to the external sound output device.

* * * * *